(12) United States Patent
Assous

(10) Patent No.: US 11,714,209 B2
(45) Date of Patent: Aug. 1, 2023

(54) METHODS OF AND APPARATUSES FOR TRANSFORMING ACOUSTIC LOG SIGNALS

(71) Applicant: Reeves Wireline Technologies Limited, Leicestershire (GB)

(72) Inventor: Said Assous, Nottingham (GB)

(73) Assignee: Weatherford Technology Holdings, LLC, Houston, TX (US)

(*) Notice: Subject to any disclaimer, the term of this patent is extended or adjusted under 35 U.S.C. 154(b) by 376 days.

(21) Appl. No.: 16/839,842

(22) Filed: Apr. 3, 2020

(65) Prior Publication Data
US 2020/0363551 A1    Nov. 19, 2020

(30) Foreign Application Priority Data

Apr. 11, 2019 (GB) .................................... 1905162

(51) Int. Cl.
*G01V 1/50* (2006.01)
*E21B 47/14* (2006.01)
*G01V 1/30* (2006.01)

(52) U.S. Cl.
CPC ................ *G01V 1/50* (2013.01); *E21B 47/14* (2013.01); *G01V 1/307* (2013.01); *G01V 2210/47* (2013.01); *G01V 2210/63* (2013.01)

(58) Field of Classification Search
CPC ...... G01V 1/50; G01V 1/307; G01V 2210/47; G01V 2210/63; E21B 47/14
See application file for complete search history.

(56) References Cited

U.S. PATENT DOCUMENTS

| 5,808,963 A * | 9/1998 | Esmersoy ................ G01V 1/48 |
| | | 702/6 |
| 2017/0102475 A1 | 4/2017 | Mukhopadhyay et al. |
| 2019/0055830 A1* | 2/2019 | Skataric ................ G01V 1/282 |

FOREIGN PATENT DOCUMENTS

| WO | 2017165341 A2 | 9/2017 | |
| WO | WO-2017165341 A2 * | 9/2017 | ............. G01V 1/282 |
| WO | 2017205075 A1 | 11/2017 | |

OTHER PUBLICATIONS

UK Search Report received in copending UK Application No. GB1905162.2, dated Jul. 25, 2019, 1 page.

* cited by examiner

*Primary Examiner* — Regis J Betsch
(74) *Attorney, Agent, or Firm* — Cabello Hall Zinda, PLLC

(57) ABSTRACT

In a method to transform logs, an acoustic logging tool inserted into a borehole includes a source and an array of receiver stations. Each station includes a receiver spaced along the tool from the source by successively greater distances. In the method, the source emits energy (I) to cause the propagation towards the stations of plural signals exhibiting paths characteristic of first and second respective modes and (II) to stimulate a receiver of each station to generate an output signal per station that indicates the signal packets and represents the modes in combination with one another. In the method, the output signals are transformed into transformed signals containing phase/amplitude information of each mode. The phase/amplitude are linked by an operator to the slowness and attenuation of the mode and the transmitter-receiver distance of the station. The phase/amplitude are used to extract slowness and attenuation information for each mode.

11 Claims, 8 Drawing Sheets

METHODS OF AND APPARATUSES FOR TRANSFORMING ACOUSTIC LOG SIGNALS

FIELD OF THE DISCLOSURE

The invention relates to methods of and apparatuses for transforming acoustic log signals, and for deriving useful signals from such transformations. More generally the invention relates to techniques of processing and analysis that are useful in well logging.

BACKGROUND OF THE DISCLOSURE

In broad terms, logging typically involves inserting a logging tool, that in most cases is an elongate, rigid cylinder, into a borehole where the logging tool generates log signals that are indicative of the geological and other characteristics of the environment surrounding the borehole.

Parameters of the signals are formed into logs which are ordered collections of signals, parts of signals and/or information, representing downhole conditions and constituted by or derived from the log signals. Depending on their exact nature such logs maybe stored, transmitted, further processed, displayed or printed and they may be represented as mathematical models or functions, collections of data values or various forms of graphical image including colored plots and graph traces. The essence of a log however is a plurality of physical signals, and references herein to "log data" generally are references to such signals (or parts or derivatives of signals), either in their as-created forms or following conversion in some way. A non-limiting example of such conversion is the conversion of an acoustic signal to an electrical signal.

Logging is extensively used in the oil and gas industries, for example to identify regions of rock that bear hydrocarbons the recovery of which is desired. It further is used in such industries to identify regions of geology that may be problematic from the standpoint of rock stability, ease of drilling, water (or other chemical) injection and various aspects associated with the production of hydrocarbons.

Logging also is of use in the identification of subterranean sources of other chemicals, including water such as groundwater, or to help locate regions that are likely to be good sources of geothermal energy; and additionally in other branches of mineral recovery such as shaft and open-cast mining.

Logging moreover is of use in the construction and tunneling industries when for example it is desired to establish the stability of rock or the relative ease with which it can be drilled, cut or dug.

Yet a further application of logging is in the "carbon capture" industry in which carbon dioxide that otherwise would escape into the atmosphere may be stored in subterranean locations where it does not influence the climate systems of the Earth. Logging may be used to assess the suitability of underground locations for this purpose.

Logging is economically an important activity. The process of logging is of high commercial value; and it often is key to promoting higher value activities associated with production from an oil or gas field.

The invention is of use potentially in all such applications of acoustic logging.

Many boreholes are formed e.g. by drilling downwardly, either vertically downwardly or inclinedly downwardly, into rock such as the ground or a seabed; but it is also well known to create boreholes that extend predominantly horizontally, e.g. sideways into a subsurface geological structure.

Boreholes may be intended to be straight or they may intentionally be non-straight, for example in order to avoid regions of rock that are difficult to drill or to maximize the distance for which the borehole extends through a particular type of geology such as a formation that contains hydrocarbons or other chemicals that it is required to recover to surface locations. The shapes and dimensions of boreholes can change after they are formed. Some boreholes that are intended to be straight and/or parallel sided can adopt other shape characteristics over time.

Logging techniques have been developed for logging a great variety of borehole types and designs. The invention is useful in the logging of a wide range of boreholes.

Usually the generated log signals are electrical signals, although this is not always the case. Electrical log signals can be transmitted to a surface location for example using wireline (i.e. elongate, armored cabling that connects the logging tool to a surface location and permits the transmission of log data signals, commands and electrical power between the logging tool and the surface location or vice versa).

Alternatively the logging tool may be of a type that includes an on-board power source and a memory for recording the log data signals. This type of logging tool completes a logging operation before being recovered to a surface location at which the log data are downloaded, typically as electrical signals, for processing and analysis.

Another option that avoids the use of wireline is to provide a self-powered logging tool that communicates log data to a surface location as a sequence of coded pulses generated in mud or another fluid surrounding the logging tool in a borehole.

The deployment of logging tools to their downhole, operational locations (the terms "downhole" and "uphole" being familiar to those of skill in the art) may take place in a variety of ways as is known. Logging normally takes place while a deployed logging tool undergoes movement, that may not be continuous movement, in an uphole direction towards a surface location, although it is also known for logging to take place while logging tools are being deployed in a downhole direction. It further is known (and in some cases is essential) for logging to take place while a logging tool is stationary in a downhole location.

Logging in the majority of cases involves causing a logging tool inserted in a borehole to emit energy into the surrounding rock. The energy passes from the point(s) of emission to one or more receivers of energy that are spaced from the emission point(s). In most, but not all, cases the receivers are spaced along the body of the logging tool from one or more energy emitters.

An aim in many types of logging is to cause the emitted energy to pass through the surrounding rock before it encounters the receivers. The passage of the energy through the rock alters its character. The receivers are sensitive to the received energy and are arranged to generate signals that are characteristic of it.

Such signals imply information about conditions such as the physical and chemical properties encountered by the energy on the path(s) between the emitter(s) and the receivers. Sometimes comparisons between the emitted and received energy signals are made in order to reveal information about the subterranean rock and conditions.

One branch of openhole logging (the terms "openhole" and "cased hole" also being familiar to those of skill in the art and not requiring explanation herein) falling within the general topic outlined above is that of acoustic logging. This is also sometimes referred to as sonic logging, the terms "acoustic" and "sonic" being used synonymously herein.

In acoustic logging (typically) plural acoustic sources near the in-use downhole end of a logging tool generate acoustic energy that is transmitted from the logging tool in the borehole in pulses. The energy travels from the source(s) and gives rise to various wave modes in the rock and, additionally, at the borehole-rock interface. The different modes have distinct characteristics and have been the subject of extensive study in the prior art.

Some of the emitted energy after a delay representing its travel time encounters and is detected by the receivers that as mentioned are located spaced from the source(s), normally in an uphole direction along the length of the logging tool. The receivers as a result generate signals, that typically are electrical signals, containing information about the received energy. The travel times and numerous other characteristics of the various wave modes differ from one another with the result that the receivers usually are stimulated multiple times following the emission of energy from the logging tool.

For such reasons the energy detected at the receivers normally is characteristic of more than one mode. The energies of the different modes usually are mingled together in terms of arrival time, frequency, amplitude and/or phase in a manner that hinders the modes making up the signals generated by the receivers from being analyzed and processed separately. In the absence of steps to identify the modes and separate them from one another the signals generated by the receivers therefore are of limited or no practical use. Such steps therefore form an important part of acoustic log analysis and processing.

As mentioned many modern acoustic logging tools include more than one source of acoustic energy. Thus it is known for such logging tools to include e.g. a monopole source and two mutually orthogonally orientated dipole sources spaced over a short length along the logging tool at its in-use downhole end. An acoustic logging tool may additionally or alternatively include a quadrupole acoustic source.

The terms "monopole", "dipole" and "quadrupole" are familiar to those of skill in the acoustic logging art, and at least the basic properties of modes generated by activation of such sources are assumed herein to be known.

Monopole sources used in borehole sonic logging tools excite compressional and shear body waves in the rock formation, and Stoneley guided waves that travel along the borehole wall. Dipole or quadrupole sources excite flexural or screw guided waves that also travel along the borehole wall. Energy from leaky-P and higher order modes may also be present.

The invention is useable in and applicable to all acoustic logging activities and logging tool types as disclosed; and disclosures of embodiments herein may be considered as disclosures non-limitingly in combination with such logging tools and activities.

The guided waves (including flexural waves) are dispersive, meaning that slowness values derivable when they are detected by the receivers are frequency-dependent. Stoneley waves (rock-fluid interface tube waves) excited by monopole sources and imperfect dipole sources are also dispersive, with the result that slownesses derived from them also are frequency-dependent. The dispersive nature of these various modes complicates the derivation of useful information from them.

Attenuation, as may be derived from acoustic log signals, may also be frequency-dependent.

The slownesses (inverse velocities) of the acoustic waves that propagate through the rock formation and/or along the borehole wall typically are among the primary deliverables from any openhole acoustic well or other borehole logging activity. The most important of these are the compressional, shear and Stoneley slowness values.

In formations the shear slowness of which exceeds the compressional slowness of the borehole fluid, the shear slowness cannot be measured directly. Instead, it is inferred from the flexural mode excited by a dipole transmitter (acoustic source). Since flexural and Stoneley waves are dispersive, for any given combination of rock and borehole each frequency has a unique slowness for each mode. Thus instead of the rock having one slowness, it has a range that for each mode may be represented or visualized by its dispersion curve, that is often presented as a cross plot of slowness vs frequency. Attenuation, also having a dependence on frequency, may be visualized as a plot of attenuation vs frequency. Such plots are convenient ways of graphically representing physical properties of a formation.

A challenge is to create the individual dispersion curves from signals that contain more than one mode, for example from signals that contain flexural and Stoneley components that overlap in time and frequency. The problem is extremely difficult when the energy ratio between components is large, and when the signals are noisy i.e. when (for example) the average amplitude of one component is many times different to that of the second or third components. Energy ratios in excess of 10:1 are not uncommon.

With the exception of the method disclosed as GB 2515009 A, prior art methods suffer poor measurement resolution. Identified mode slowness values can appear to have a potentially broad range of values, the range being represented by a somewhat large region of high signal coherence in the time-frequency (or other chosen) domain. In this respect the concept of coherence and the nature of a coherence plot are known in the art. These concepts are explained herein to the extent needed for an understanding of the invention.

Attenuation is a measure of the rate at which the magnitude of a mode signal reduces as a function of distance along its path between a source and a receiver, and in the case of dispersive modes it also depends on frequency. This makes it very difficult to separate attenuation information in the case of mixed mode signals which also overlap in time.

Single-sided data refers to the signals received at each receiver in a longitudinal receiver array in which all the receivers have the same azimuthal orientation with respect to a reference point on the outer circumference (usually taken as the azimuth of one of the dipole transmitters) of the logging tool.

In the case of an exemplary Weatherford cross-dipole acoustic logging tool referred herein as "CXD" there are 4 such longitudinal arrays separated azimuthally by 90 degrees, each array comprising 8 receivers with a common inter-receiver separation, aligned along the tool such that there are 8 groups of 4 receivers known as "stations".

Prior art solutions combine signals from more than one receiver at each station in an attempt (amongst other things) to separate modes. In the case of cross-dipole excitation, signals in the prior art are combined from receivers 180 degrees apart. In the ideal case of a tool centralized in a circular section borehole, this will tend to enhance one mode relative to another, but is capable of providing only two orthogonal slowness sets. The prior art thus delivers fewer azimuthal data sets than the number implied by the number of azimuthal receiver positions at each station.

In the case of monopole excitation, in the prior art signals from each receiver forming a station are summed in order to determine the slowness of the non-dispersive compressional mode. Azimuthal variations in compressional slowness are not sensed. Embodiments disclosed herein permit a novel, single-sided approach that allows azimuthal variations in compressional slowness to be investigated.

A common prior art approach is to provide a single value of slowness for each mode, and not to compute the dispersion curves. This value is typically calculated at one frequency (or over a narrow range of frequencies, usually selected manually). If the frequency is in a range which does not allow interpretation objectives to be met, the slowness may be "dispersion corrected", meaning a shift is applied.

Defining an appropriate value for the shift can be problematic. For example if formation shear slowness is required, it is obtained from the low-frequency asymptote of the flexural dispersion curve. If the dispersion curve is not computed, the alternative is to bandpass-filter the signals. However, this strategy requires selection and application of appropriate filters; and does not work if the low frequencies are absent, or in the multi-mode case outlined above.

The multi-mode aspect has been approached (in the case of dipole measurements) by attempting to isolate the two main modes (flexural and Stoneley) by combining signals from receiver pairs 180 degrees apart on the tool as outlined above. Subtracting the signals tends to cancel the Stoneley energy, while adding them tends to cancel the flexural energy. This solution is commonly employed by logging companies, but works perfectly only in a perfectly centralized tool in a perfectly circular section borehole. Such conditions may not arise in practice.

The multi-mode aspect can also be approached using a Slowness-Frequency-Coherence (SFC) method. There are several SFC variants, but they all suffer from poor measurement resolution (see below), they suffer from aliases, and they may not be capable of resolving modes that overlap in time and frequency.

FIG. 2 hereof illustrates typical ambiguities caused by aliasing, and other drawbacks of prior art methods of determining the modes making up the signals stimulated at the receiver stations. FIG. 2 is a slowness-frequency coherence (SFC) plot in which the x-axis represents frequency (typically in kHz) and the y-axis represents slowness in microseconds/ft; and in which the light bands are regions of high coherence of energy levels as determined using a linear algebra technique known as Matrix Pencil. In FIG. 2 the Stoneley mode slowness is represented by the high coherence band 41 and the flexural slowness by the band 42.

It is clear from FIG. 2 that using conventional SFC methods, above a certain signal frequency, multiple slowness values per frequency are apparent as represented by plural high-coherence regions 47, 48, 49, 51, 52, 53 and 54. Such ambiguities are notoriously difficult to interpret correctly and it is possible to select an entirely incorrect slowness value at certain frequencies.

The flexural energy asymptotes at low frequency to the shear slowness of the formation. This is a useful quantity but as is apparent in FIG. 2 (that in several respects is typical of several types of slowness coherence plot) at low frequency the flexural slowness coherence broadens to become very indistinct.

For any given frequency, the shape of the slowness-coherence distribution is revealed by taking a slice perpendicular to the frequency axis, the concept of a "slice" in a plot such as FIG. 2 being familiar to the person of skill in the art. Coherence distributions are commonly not symmetrical, and commonly do not have a well-defined peak. Indeed, they are usually relatively flat such that the slowness is poorly defined at any given frequency. Slowness resolution is clearly poor within such indistinct regions of the slowness-coherence plots. Some SFC methods are associated with even poorer slowness resolution than that from the aforementioned Matrix Pencil technique.

The known method variants that can resolve overlapping modes are slow to practice. This makes them impractical for the analysis of every depth frame (the concept of a depth frame also being familiar to the person of skill in the art). SFC analysis (if done at all) is therefore delivered most commonly in the form of SFC crossplots at selected (infrequent) depths.

Slowness measurement resolution has been addressed to some extent by the evolution of the slowness-frequency methods alluded to above. Several of these are reviewed in "*Acoustic Dispersion from Phase Moveout in Array Sonic Data*" (Assous and Elkington, SPWLA 2014). All the slowness-frequency methods have one thing in common, namely that they identify nothing more precise than a region in a slowness-frequency space where the slowness value might lie.

As a result the slowness calculated by the prior art methods has a finite measurement resolution which commonly is low. For example, at a low frequency (around 1 kHz, say) the flexural mode high coherence region for a common formation may span in excess of 100 microseconds/ft. Algorithms exist that search for the peak coherence, and may or may not assume there is just one coherence peak, and may or may not take account of asymmetry in the coherence peak.

Such an algorithm will generate a slowness (291 microseconds/ft for example) but the uncertainty in that number is not generally calculated or presented.

Workers in this area have attempted to improve resolution, but even the best prior art method identifies a region, and not a single value, for the slowness.

The invention seeks to address or at least ameliorate one or more drawbacks of prior art logging methods.

SUMMARY OF THE DISCLOSURE

According to embodiments described herein a method of invertibly transforming acoustic log signals comprises the steps of:

a) inserting into a borehole, forming part of a borehole-formation system in which the borehole penetrates a rock formation, an elongate acoustic logging tool, the acoustic logging tool including at least one dipole acoustic source and, spaced from the acoustic source along the logging tool, a sequential array of two or more acoustic signal receiver stations, the receiver stations each including at least one receiver and being spaced along the logging tool from the acoustic source by successively greater known transmitter-receiver distances whose minimum separation is greater than the minimum detectable wavelength corresponding to a formation slowness range of interest;

b) causing the acoustic source to emit acoustic energy in a manner (i) effecting the propagation in the borehole-formation system towards the receiver stations of plural signal packets exhibiting paths characteristic of at least first and second respective modes one or more of which is dispersive and (ii) stimulating at least one receiver of respective, sequential, spaced receiver stations to generate at least one output signal per receiver station that is indicative of the signal packets, received at the at least one receiver of each respective receiver station, representing the modes in combination with one another;

c) transforming the output signals into respective transformed mode signals containing phase and amplitude information of each respective mode across the array and in which estimated phase and amplitude information are linked by an operator to the slowness and attenuation characteristics of the respective mode and the transmitter-receiver distance of the respective receiver station;

d) using the estimated phase and amplitude information for each mode from each receiver in the acoustic array to extract slowness and attenuation information for each mode from the output signals and generating signals indicative of the slowness and/or attenuation characteristics; and e) using the signals indicative of the slowness and/or attenuation characteristics in plotting, storing; transmitting, displaying, printing or further processing the slowness and/or attenuation characteristics.

This method is associated with numerous advantages over the prior art. Primary among these is the ability, provided by the method of the invention, readily to extract alias-free slowness and attenuation information notwithstanding that acoustic signals received at a logging tool receiver array may contain multiple modes that overlap as to frequency and/or arrival time, and suffer from the amplitude ratio problem identified (e.g. when the energy ratio between components is large when (for example) the average amplitude of one component is many times different to that of another which has taken a different path); or when the signals are noisy.

As noted it has been difficult or impossible previously to separate slowness and attenuation information from such signals as to do so the amplitude for each mode needs to be estimated and this cannot be done using the prior art methods. The invention permits the generation of dispersion plots of slowness and frequency-dependent attenuation that are likely to be highly useful in identifying characteristics of geological formations and features. Such plots resulting from practicing the method of the invention are beneficially continuous over a wide frequency range. This renders them significantly more useful than prior art dispersion crossplots at selected frequencies.

Furthermore the method beneficially may be applied on a "single-sided" basis, under which the output of each receiver in a quadrant (or other multiple receiver pattern) may be individually processed in order to produce useful slowness and attenuation outputs.

This means that the number of useful outputs per logging tool is significantly increased, since it is no longer necessary to process the receivers of a station in oppositely located pairs (or other combinations) as is a result of the prior art subtraction and addition techniques described above.

Additionally since the method of embodiments described herein completely avoids the requirement to cancel the Stoneley mode by subtraction during dipole excitation, single-sided outputs of slowness and attenuation can be created without concern for whether the logging tool is centered in the borehole; and indeed may be employed to determine the degree of eccentering (this also being a term known to those of skill in the art, referring to offsetting of a downhole tool from a centralized position in a borehole) when this occurs.

In its simple form this method requires the presence of a single receiver per receiver station. In practical embodiments there probably would be provided more than one receiver per spaced receiver station but if the method is embodied using a single receiver per receiver station it is necessary for the receivers at each of at least two such receiver stations to have the same azimuthal orientation relative to a datum on the tool. Moreover when the method is practiced in respect of data from dipole excitation the described common receiver azimuth must be the same as that of the (directional) transmitter element. In practical embodiments the receivers having the same pole identification (e.g. the respective first and second poles of a dipole receiver station, or the respective quadrant poles of a quadrupole receiver station) would have the same azimuthal orientation for all the receiver stations along the logging tool; but conceivably this need not be the case. Consequently, arrangements in which not all the same pole-identification receivers are aligned at the same azimuthal orientation are possible.

The step of transforming the output signals into transformed mode signals may be performed e.g. through use of an electronic circuit. Such a circuit may be hard-wired. Numerous designs of circuit are possible for effecting the transform forming part of the method.

Alternatively the transforming step may be performed using an appropriately programmed or otherwise configured processing device such as but not limited to a digital computer.

Preferably the inter-receiver distance along the logging tool between each adjacent pair of the receiver stations is the same; but equally it is possible to perform the method of the invention when the inter-receiver distance along the logging tool is not the same from one receiver station to another, the parameters of the method steps requiring straightforward adjustment in order to accommodate such a situation.

As noted the prior art coherence assessment methods of establishing slowness suffer from poor resolution characteristics. The method of the invention makes possible a higher resolution determination of slowness and attenuation than hitherto has been possible. To this end in embodiments described herein preferably the Step d) of using the estimated phase and amplitude information for each mode to extract slowness and attenuation information for each mode from the output signals includes e) generating complex spectra information from the receiver array signals and taking the real and imaginary parts of the transformed mode signals containing respective amplitude and phase components of the respective modes to be extracted; and f) if the number of receivers exceeds the minimum needed to determine slowness and amplitude for each frequency and mode of interest, solving for mode amplitude and slowness by minimizing in a least squares sense the differences between real and imaginary mode amplitudes and the real and imaginary amplitudes of the combined modes observed in the spectra of received signals for each frequency.

In particular the error minimization steps preferably include representing the real and imaginary parts between estimated and received signals as objective functions and summing the squares of the objective function signals over the two or more receiver stations.

This approach leads to uniquely determined slowness and amplitude values at each frequency, for each mode. Moreover, the determination of both slowness and amplitude at each frequency for each mode means that the data are invertible, meaning that the measured signals can be reconstructed from the results of the invention. When presented graphically such results immediately instill high confidence as to the magnitude and resolution of the extraction of log values; and they are self-evidently greatly superior to prior art coherence assessment-based outputs.

There are multiple possible approaches to the error minimization step that yield useful output signals when practicing the method. Thus in an embodiment preferably the Step f) of minimizing the error between terms representing the amplitude and phase detected at the receivers and terms representing amplitude and phase components in the real and imaginary parts includes using initial estimates of the amplitude and phase components of the respective modes; and using a search method to minimize the error.

In an alternative embodiment however optionally the Step f) of minimizing the error between terms representing the amplitude and phase detected at the receivers and terms representing amplitude and phase components in the real and imaginary parts includes seeding expressions representing real and imaginary parts with estimated values of the slownesses of the respective modes; and solving for values of the respective amplitudes that minimize the said error.

Such steps give rise to the unique slowness solutions at each frequency as mentioned.

The method involving using initial estimates may produce so-called "aliases", which are capable of being mis-identified as primary modes. The topic of aliases is discussed below in further detail, embodiments described herein providing a highly effective method of correcting them in or eliminating them from acoustic log data results.

Preferably the Step c) of transforming the output signals into respective transformed mode signals includes representing the transformed mode signals in the case of two modes in the form $$C_n \cos(c_n) - (A \cos(a_n) + B \cos(b_n)) = 0 \quad (1)$$

in which $C_n$ is the amplitude of the signal stimulated at receiver n of the array; $c_n$ is the corresponding phase; A is the estimated amplitude of the first mode stimulated across the array at a given frequency; $a_n$ is the estimated phase of the first mode stimulated at receiver n of the array; B is the estimated amplitude of the second mode stimulated across the array at the given frequency; $b_n$ is the estimated phase of the second mode stimulated at receiver n of the array; and the Step d) of using the estimated phase and amplitude information for each mode to extract slowness and attenuation information for each mode includes generating a pair of error expressions based on Equation 1 and using the objective function to minimize the error between the terms $C_n$ and $c_n$ on the one hand, and the terms A, B, $a_n$ and $b_n$ on the other.

This and subsequent expressions herein consider the two-mode case, but the approach is not limited to two modes. Additional modes can be handled by adding more mode amplitude and mode phase terms to Equation 1. The maximum number of modes that can be separated is controlled by the number of receiver stations in each longitudinal array, at least two being required per mode. The invention includes such embodiments that take account of more than two modes, in addition to the described two-mode examples.

In embodiments the method preferably includes repeating at least Steps c) and d) in respect of a range of frequencies of the respective output signals. Further the method preferably includes the step of g) constructing respective mode signals in respect of each receiver within the array. Thus the invention is capable of giving rise to slowness (dispersion) curves constituted by (typically electrical) signals representing the physical characteristics of slowness and attenuation of the formation in which the borehole is formed.

In embodiments described herein in which the exciting source is a dipole, the first and second modes respectively are flexural and Stoneley acoustic modes. However as stated more than two modes may be analyzed and extracted using the methods of the invention; and the invention is not limited to the modes including respective flexural and Stoneley modes as is preferred, nor is the invention limited to the case of dipole excitation.

An important, beneficial feature of the method disclosed herein is that it is fully invertible as stated. This means given a set of slowness and attenuation values at a particular frequency it is possible to practice the method "in reverse" and derive the acoustic signals stimulated at the receivers. This in turn permits the ready verification (when for example the receiver signals are already known) that the method accurately generates the required slowness and attenuation values, thereby demonstrably reinforcing confidence in the method. To such ends in embodiments the method optionally includes the step of h) creating a reconstructed array signal from the constructed respective mode signals in order to permit comparison between the reconstructed array signal and the output signals.

A further artefact of acoustic logging tools is a tendency for energy to "leak" from the signals in one frequency bin undergoing transformation to another. There are two causes of this, a windowing (Gibbs phenomenon) effect; and leakage that occurs when the frequency of the bin is other than an integer multiple of the sampling frequency Fs/N.

These phenomena are explained hereinbelow, and cause inaccuracies and errors in log signals generated using acoustic logging tools.

According to the disclosure in a further aspect a method of correcting for energy contamination from one frequency to another of one or more frequency domain acoustic signals generated at two or more receivers of an acoustic logging tool comprising at least one acoustic source that is capable of generating at least one acoustic impulse for transmission in a formation penetrated by a borehole and, spaced from the at least one acoustic source along the logging tool, at least two acoustic signal receiver stations, the energy leakage causing energy within a first frequency band to leak to at least second and third frequency bands that respectively are adjacently less than and greater than the first frequency band in a frequency spectrum including the first and at least second and third frequencies, comprises the steps of (i) transforming the one or more acoustic signals to a frequency domain form having real and imaginary parts; (j) using the real and imaginary parts from a first frequency band to estimate the amplitudes and phases of one or more mode-specific signals at the first and at least second and third frequency bands by reconstructing the delayed monochromatic signal corresponding to the at least first mode in the frequency band, the delay corresponding to an estimated arrival time for the fastest of the at least one mode, and by estimating the amplitude and phase contributions in all other frequency bands then subtracting that contribution from the real and imaginary parts of the first frequency band; (k) determining, for one or more signal modes, mode-specific slowness values at the first frequency and the at least second and third frequencies; (l) using the amplitudes and phases estimated from the real and imaginary parts and the slowness values to solve for the true amplitude and phase of the one or more acoustic mode signals at the first frequency, and (m) repeating steps (i) to (l) for a second and remaining frequency bands.

This method beneficially eliminates the leakage phenomenon to a considerably better degree than any prior art technique; is flexible in terms of the number of modes solved for and furthermore is effective regardless of the exact cause of energy leakage from one frequency to another.

In view of the last-mentioned advantage, preferably the energy contamination may arise when one or more frequencies of the one or more acoustic signals received at the at least two signal receiver stations are non-integer multiples of the frequency resolution $F_s/N$ of the at least two signal receiver stations where $F_s$ is a sampling frequency of the signal at the at least two receiver stations and N is the number of samples of the signal at the at least two receiver stations.

Additionally or alternatively the energy contamination may arise when the one or more acoustic signals received at the at least two signal receiver stations is modified in a manner resembling multiplication by a time-varying function resulting from activation of the at least two signal receiver stations at a time after generation of an acoustic impulse by the at least one acoustic source thereby causing the at least two signal receiver stations to output one or more time-limited signals, the method thereby taking into account the Gibb's phenomenon effect associated with the absence of mode energy in the one or more time-limited signals before arrival via the borehole and rock formation at the at least two signal receiver stations.

In embodiments the time-varying function may be or may include a signal having a value of zero (other than unavoidable noise) before activation of the at least two receiver stations, and a value of 1 (other than unavoidable noise) thereafter for a limited time. Thus the signal represents the effect of the time delay before activation of the receivers starts, as explained further hereinbelow.

The method of this aspect of the disclosure preferably includes, as an operative part of the solution, the steps of (n) inserting signals corresponding to the real and imaginary amplitudes of the mode-specific transformed frequency domain signals generated in respect of each frequency bin at each of the at least two signal receiver stations into a matrix A; and (o) using the determined slowness values, solving for Ax=C where C and x are observed and true amplitudes respectively. In such a method preferably the Step (o) of solving for Ax=C includes (p) iteratively solving Ax=C for a range of estimated values of mode-specific slowness until the L2 norm error $\|Ax-C\|$ is minimised in a least squares sense.

The nature and benefits of these steps are described below.

In embodiments the method includes the steps of, before Step (i), inserting into a borehole, forming part of a borehole-formation system in which the borehole penetrates a rock formation, the elongate acoustic logging tool, the acoustic logging tool including at least one dipole acoustic source; and causing the acoustic source to emit acoustic energy in a manner (I) effecting the propagation in the borehole-formation system towards the at least two acoustic signal receiver stations of plural signal packets exhibiting paths characteristic of at least first and second respective modes one or more of which is dispersive and (II) stimulating at least one receiver of each sequential acoustic signal receiver station to generate at least one output signal per receiver station that is indicative of the signal packets, received at at least one acoustic signal receiver of each respective acoustic signal receiver station, representing the modes in combination with one another.

Preferably the inter-receiver distance along the logging tool between each adjacent pair of the at least two acoustic signal receiver stations is the same; but this need not be the case, and the method may be successfully operated even if the inter-receiver spacings are not all the same, it being necessary simply that each spacing is known.

Preferably at least Steps (i) to (m) are performed using a programmable device. This is primarily because of the ability of such a device to process large amounts of signal energy in a rapid and reliable manner.

As also mentioned above and explained with reference to FIG. 2, aliasing is a significant problem in the interpretation of acoustic logs.

According to a further embodiment disclosed herein there is provided a method of processing one or more output signals of two or more receivers defining an array of receivers of an acoustic logging tool, the receivers being spaced along the logging tool from an acoustic source, the logging tool extending in a borehole intersecting a formation having a dispersive slowness characteristic, the receivers being spaced from one another by one or more known distances $X_1 \ldots Xn$, $n \geq 1$, defining at least a first spatial sampling frequency $1/X_1$ giving rise to at least a first spatial frequency resolution $1/X_1/n$ of the logging tool, the method comprising the steps of:

q) for each of two or more numbered frequency bins representing a respective output signal frequency, separating the or each output signal into a plurality of spectrum signals each being characterized by a value of amplitude, spatial frequency and phase, the phase being linked by a first relationship to the frequency-specific slowness of the formation, the output signal frequency and the distance of each receiver from the acoustic source;

r) in respect of two or more frequency bins, using a second relationship linking the slowness of the formation, the spatial frequency resolution of the logging tool and the number of the bin to determine minimum and maximum slowness values that are resolvable at the output signal frequency represented by the bin;

s) determining slowness results using the first relationship; and t) eliminating from the slowness results any slowness values less than the minimum slowness and any slowness values greater than the maximum slowness resolvable at the output signal frequency represented by the said bin.

The spatial frequency resolution of a logging tool is a concept that is understood by those of skill in the logging tool art, and relates to the ability of the logging tool to resolve features that are apparent in the received signals.

The resolving ability of the logging tool relates to a number of its physical parameters, including the spacings of the receiver stations one from another along the logging tool and the frequency with which the receivers are sampled. The resolution may vary from one part of the tool to another, for example because of differing spacings of respective pairs of the receiver stations; but in many cases the spacings of the pairs of receiver stations are all the same all the way along the receiver part of the logging tool. In such cases the resolution does not change, along the length of the logging tool, as a result of variations in the longitudinal receiver-receiver spacings.

The foregoing method is advantageous because it can largely or entirely eliminate aliases, thereby rendering the output of an acoustic logging tool significantly less ambiguous than has been the case in the prior art.

Detailed practical steps of the method of the second embodiment, in particular relating to the deployment and activation of an acoustic logging tool, are similar to those described in relation to the first embodiment described above and are set out as follows.

The method of the second embodiment further includes allocating the energy of any resulting eliminated slowness value to at least one slowness value less than the maximum slowness value and greater than the minimum slowness value.

The method of the second embodiment further includes the steps of, before Step (q), inserting into a borehole, forming part of a borehole-formation system in which the borehole penetrates a rock formation, the elongate acoustic logging tool, the acoustic logging tool including at least one dipole acoustic source; and causing the acoustic source to emit acoustic energy in a manner (I) effecting the propagation in the borehole-formation system towards the receiver stations of plural signal packets exhibiting paths characteristic of at least first and second respective modes one or more of which is dispersive and (II) stimulating at least one receiver of each sequential receiver station to generate at least one output signal per receiver station that is indicative of the signal packets, received at the at least one receiver of each respective receiver station, representing the modes in combination with one another.

In the method of the second embodiment, the inter-receiver distance along the logging tool between each adjacent pair of the receiver stations is the same.

The method of the second embodiment further includes repeating Steps q), r), s) and t) in respect of a range of frequencies of the respective output signals.

In the method of the second embodiment, at least Step q) of separating the or each output signal into a plurality of spectrum signals is performed using an electronic circuit.

In the method of the second embodiment, at least Step q) of separating the or each output signal into a plurality of spectrum signals is performed using a programmable device.

In embodiments described herein there is provided a borehole-apparatus system comprising (A) a borehole penetrating a rock formation; (B) an elongate acoustic logging tool, the acoustic logging tool including at least one acoustic source and, spaced from the acoustic source along the logging tool, a sequential array of acoustic signal receiver stations, the receiver stations each including at least one receiver and being spaced along the logging tool from the acoustic source by successively greater known transmitter-receiver distances, the acoustic source being capable of emitting acoustic energy in a manner (i) effecting the propagation in the borehole-formation system towards the receiver stations of plural signal packets exhibiting paths characteristic of at least first and second respective modes one or more of which is dispersive and (ii) stimulating at least one receiver of each sequential receiver station to generate at least one output signal per receiver station that is indicative of the signal packets, received at the at least one receiver of each respective receiver station, representing the modes in combination with one another; and (C) one or more processing devices that is operatively connected to the acoustic logging tool and is capable of carrying out in respect of the output signals at least Steps (c) to (d) detailed above.

Further disclosed herein is a borehole-apparatus system comprising (A) a borehole penetrating a rock formation; (B) an elongate acoustic logging tool, the acoustic logging tool including at least one acoustic source and, spaced from the acoustic source along the logging tool, a sequential array of acoustic signal receiver stations, the receiver stations each including at least one receiver and being spaced along the logging tool from the acoustic source by successively greater known transmitter-receiver distances, the acoustic source being capable of emitting acoustic energy in a manner (i) effecting the propagation in the borehole-formation system towards the receiver stations of plural signal packets exhibiting paths characteristic of at least first and second respective modes one or more of which is dispersive and (ii) stimulating at least one receiver of each sequential receiver station to generate at least one output signal per receiver station that is indicative of the signal packets, received at the at least one receiver of each respective receiver station, representing the modes in combination with one another; and (C) one or more processor devices that is operatively connected to the acoustic logging tool and is capable of carrying out in respect of the output signals at least Steps (i) to (l) detailed above.

Also disclosed herein is a borehole-apparatus system comprising (A) a borehole penetrating a rock formation; (B) an elongate acoustic logging tool, the acoustic logging tool including at least one acoustic source and, spaced from the acoustic source along the logging tool, a sequential array of acoustic signal receiver stations, the receiver stations each including at least one receiver and being spaced along the logging tool from the acoustic source by successively greater known transmitter-receiver distances, the acoustic source being capable of emitting acoustic energy with linear or non-linear phase characteristics in a manner (i) effecting the propagation in the borehole-formation system towards the receiver stations of plural signal packets exhibiting paths characteristic of at least first and second respective modes one or more of which is dispersive and (ii) stimulating at least one receiver of each sequential receiver station to generate at least one output signal per receiver station that is indicative of the signal packets, received at the at least one receiver of each respective receiver station, representing the modes in combination with one another; and (C) one or more processing devices that is operatively connected to the acoustic logging tool and is capable of carrying out in respect of the output signals at least Steps (q) to (t) detailed above.

The one or more processing devices in either case may be or may include one or more electronic circuits and/or one or more programmable devices.

The acoustic source may be or may include a dipole acoustic source.

Preferably the spacings between the receiver stations are the same as one another. Alternatively however the receiver-receiver spacings may vary along the sequential array of receiver stations.

Conveniently the borehole-apparatus system includes operatively connected to the one or more processing devices one or more of a plotter, printer or display device that is capable of displaying a graphical representation of the slowness or attenuation of one or more slowness or attenuation characteristics generated by the one or more processing devices. Such a graphical representation may be a dispersion plot. Such a plot may show e.g. the dispersion of slowness values in the formation, and/or the dispersion of attenuation values.

Further the borehole-apparatus system may include operatively connectable to the programmable device one or more storage device that is capable of storing one or more values of slowness and/or attenuation generated by the processing device.

In addition the invention in an embodiment extends to a computer-readable storage medium comprising instructions which, when executed by a computer, cause the computer to carry out at least Steps c) and d) detailed above. The invention additionally or alternatively extends to a computer-readable storage medium comprising instructions which, when executed by a computer, cause the computer to carry out at least Steps i) to l) detailed above and/or steps q) to t) detailed above.

BRIEF DESCRIPTION OF THE DRAWINGS

There now follows a description of preferred embodiments of the invention, by way of non-limiting example, with reference being made to the accompanying drawings in which:

FIG. 3a shows a continuous waveform (top-left), and FIG. 3c shows a time-limited waveform (bottom-left);

FIG. 4a shows a continuous waveform with frequency that is an integer multiple of Fs/N (top), and FIG. 4c shows a similar frequency that is not an integer multiple of Fs/N (bottom);

DETAILED DESCRIPTION OF THE DISCLOSURE

Figure 1:
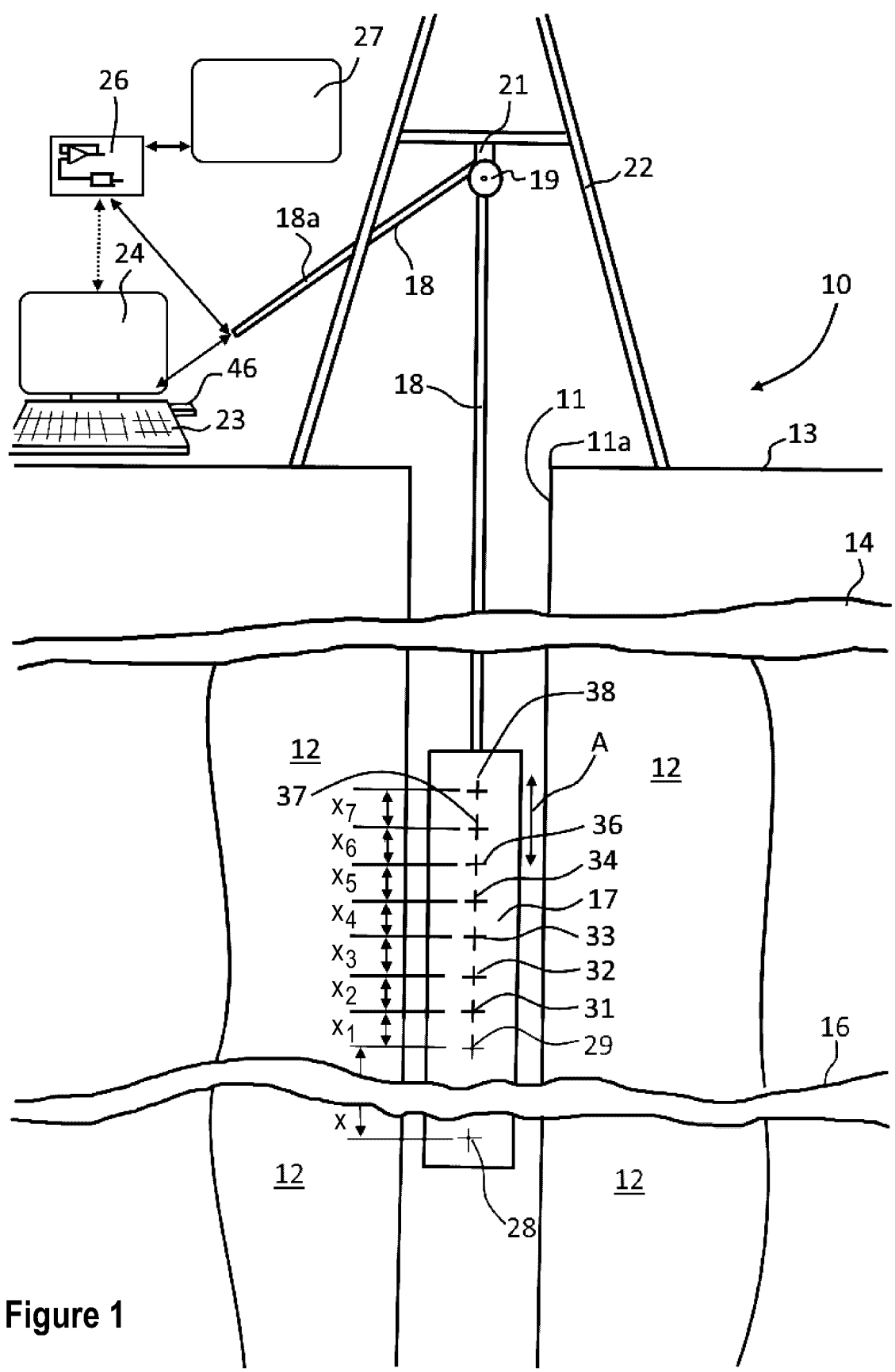
FIG. 1 is a schematic representation of a borehole-apparatus system according to the invention, including components suitable for putting into effect methods according to the invention.

Referring to the drawings FIG. 1 shows in outline, schematic form a borehole-apparatus system 10 within the scope of the invention.

In FIG. 1 a borehole 11 penetrates the ground and extends through a geological region 12 of interest.

Borehole 11 is illustrated extending vertically downwardly from the surface 13 of the ground but as explained above this need not necessarily be the case. Thus the borehole 11 could for example extend inclinedly downwardly or horizontally into the side of a mountain, hill or subsea shelf. The borehole 11 also could extend from the floor of the ocean or a lake, and therefore need not terminate at ground level as illustrated.

The borehole is schematically shown as being straight and parallel-sided. As mentioned herein however it is often intended that the borehole should follow a non-straight route. Even if this is not the case a borehole may become distorted e.g. through squeezing, partial collapse or a range of other phenomena known to those of skill in the art. The illustration of the borehole 11 as straight and parallel-sided therefore is not limiting of the invention.

The region 12 may be e.g. a porous formation bearing a product of interest such as solid (e.g. coal), liquid or gaseous hydrocarbons, or groundwater. Alternatively it may be a region of rock the properties of which it is required to investigate for some reason other than that it contains mineral material of interest. Examples of such reasons are provided in the foregoing disclosure.

All such variants as explained are within the scope of the invention.

The length of the borehole 11 is likely to be significant, and may be several hundred or thousand meters. Two break lines 14, 16 schematically signify that the borehole 11 is greatly elongate. A typical nominal diameter of the borehole may be approximately 215 mm (about 8.5"), being a widely used subterranean rock drill bit diameter; but other diameters are known and widely encountered An acoustic logging tool 17 is shown inserted in the borehole 11. Logging tool 17 is in the embodiment shown an elongate, semi-rigid (e.g. metal alloy) cylinder of lesser external diameter than the nominal diameter of the borehole 11. The break line 16 extending across the logging tool 17 schematically signifies that proportionately the logging tool in reality is somewhat more elongate than it is readily possible to illustrate.

Certain details of the logging tool 17 that normally are present are omitted from FIG. 1 for ease of viewing. Such features may include e.g. one or more centralizers for centralizing the logging tool 17 in the borehole 11; and a range of other components as would be known to one of skill in the art.

Logging tool 17 is shown supported in the borehole 11 on wireline 18. The wireline 18 is secured to the in-use uphole end of the logging tool 17 in any of a variety of per se known ways.

The nature and properties of wireline are well known in the art and are not described in detail herein. It is however a feature of wireline that it permits the transmission of electrical log data signals from the logging tool 17 to equipment at a surface location. The wireline also transmits electrical power to the logging tool 17 for powering its operation, and also conveys a range of control commands that give rise to certain responses in the logging tool 17. Such responses could include e.g. the deployment or retraction of components forming part of the logging tool 17 or a toolstring of which it forms part; the commencement or termination of logging activity; or a variety of other responses.

The wireline furthermore is armored to protect it against the harsh conditions likely to arise in the borehole 11; and is sufficiently strong as to support the mass of the logging tool or a toolstring including the logging tool. Such mass may be several hundred kilograms.

The wireline 18 extends between the logging tool 17 and the surface location near the uphole termination 11a of the borehole 11. To this end in the illustrated embodiment the wireline 18 passes over the pulley 19 of a travelling block 21 secured depending downwardly from part of a derrick 22. The length of wireline 18a extending away from the pulley 19 remotely from the borehole 11 terminates in e.g. a deployment drum and connection arrangement that are not shown in FIG. 1. Such arrangements are familiar to the person of skill in the art, and may take a variety of forms within the scope of the invention.

In FIG. 1 two alternative arrangements for processing log signals generated by the logging tool 17 are shown. These are processing devices that in the embodiment are shown as a computer 23 including a display 24; and, in the alternative (or in combination with the computer 23) an electronic circuit 26. Circuit 26 may also be connected to e.g. a display 27; and the computer 23 or the circuit 26 may be connected to e.g. a memory device 46, a transmission device or another computer. The dotted line in FIG. 1 shows optional connection together of the circuit 26 and the computer 23 in order to create the aforesaid combination. The connection represented by the dotted line may when present be a wired connection or any of numerous types of wireless connection.

At least the computer 23 may be located significantly remotely from the illustrated surface location. In such an instance the computer 23 is unlikely to be directly connected to the wireline 18. Instead various other connection methods are possible. These include but are not limited to connection via the electronic circuit 26, wireless communication and intermediate cable connections.

The circuit 26 and/or the computer 23 may be embodied within a further device such as, but again not limited to, the displays 24 or 27.

The circuit 26 is illustrated entirely schematically and may take a variety of forms that achieve the effects described herein.

The computer 23 and the circuit 26 are capable, either individually or as a result of operating in combination with one another, of receiving the electrical signals output by the logging tool 17 and transforming/processing them as electrical energy. The outputs of the computer 23 and circuit 26 moreover may readily be in the form of further electrical signals of a novel kind, as described herein.

Other means than the described derrick 22 and dispensing drum arrangement for dispensing the wireline 18 and supporting the acoustic logging tool 17, as lie within the understanding of the person of skill in the art, are possible within the scope of the invention.

It is also possible within the scope of the invention for the logging tool 17 not to be connected to the surface by wireline 18 or any equivalent while logging is taking place. Thus for example it is possible to convey and/or deploy several forms of logging tool into an openhole region downhole supported on drill pipe, and use coded pulses in mud or another fluid in the borehole 11 to convey log signals to an uphole location where they undergo conditioning, processing and transformation as desired.

Certain acoustic logging tools alternatively are designed for completely autonomous operation when downhole. In such embodiments the logging tool in addition to the acoustic signal generating and detecting parts described below includes a source of power, such as electrical batteries; on-board processing equipment and one or more memory devices or other data stores. The memory devices store log data generated, conditioned, processed and or transformed within the logging tool 17 from signals generated at the receivers forming part of the tool.

All such logging tool variants non-limitingly are included within the scope of the invention.

As signified by double-headed arrow A, the logging tool 17 is capable of movement in either direction along the borehole 11. In a typical case logging takes place after deployment of the logging tool 17 to a desired location downhole in the borehole 11. The logging tool 17 is then operated at intervals to generate and record acoustic energy pulses as it is gradually withdrawn in an uphole direction towards the surface termination 11a where the logging tool is recovered at the end of a logging run.

One exemplary geometry of logging tool 17 is visible in FIG. 1. In FIG. 1 at its downhole end the logging tool 17 includes one or more acoustic sources 28, also referred to as transmitters. In one embodiment these may include a monopole source and two mutually orthogonally orientated dipole sources. Other combinations of acoustic sources 28 may be used; or only a single source 28 may be present.

The acoustic sources typically are of kinds that generate acoustic pulses having characteristics that are known to those of skill in the art and have been the subject of extensive study.

A linear sequence of receiver stations 29, 31, 32, 33, 34, 36, 37 and 38 are located spaced at intervals along an in-use uphole part of the logging tool 17. Each receiver station in the illustrated embodiment includes four mutually orthogonally directed receivers the designs of which are known per se and are not described in detail herein. The receivers activate when acoustic energy impinges on the surface of the logging tool 17 adjacent the receivers. When activated the receivers generate electrical signals as referred to herein.

More or fewer than the four receivers per receiver station are possible. The mutually orthogonal arrangement represents one of several ways in which the receivers can be orientated.

In the described embodiment the receivers are connected by wiring and connectors to the wireline 18, as necessary with any desired signal conditioning and/or boosting circuitry interposed between the receivers and the wireline 18. Electrical signals representative of acoustic stimulation of the receivers as a result can be transmitted via the wireline 18 to processing and/or display equipment 23, 24 and/or 26, 27.

In the described embodiment there exist eight receiver stations 29, 31, 32, 33, 34, 36, 37 and 38 extending in a line as illustrated. More or fewer receiver stations than those illustrated may be provided, in differing arrangements.

The distance x between the or each acoustic source and the in-use lowermost receiver station is known, as is the respective distance $x_1$, $x_2$, $x_3$, $x_4$, $x_5$, $x_6$, $x_7$ between adjacent pair of the receiver stations 29, 31, 32, 33, 34, 36, 37 and 38. In the illustrated example the distances $x_1$, $x_2$, . . . $x_7$ are all the same. In other embodiments this need not necessarily be the case, it being possible to compensate the output of the apparatus of the invention for variations in the spacings of the receiver stations from one to the next in the sequence illustrated.

The spacing between the receiver stations is an important parameter of the apparatus of the invention. This is partly because the method of the invention involves transforming the signals output from the receivers to forms such as Fourier transforms including phase, amplitude and frequency. Following such transformation ambiguity may arise because an absolute measure of the distance travelled by acoustic signals received at the receiver stations is unlikely to be available. As a result any phase information unwrapped from the signals that are transformed as described herein may be ambiguous as to the modulus number of cycles accommodated in the distance between any given transmitter (acoustic source) 28 and a receiver station 29, 31, 32, 33, 34, 36, 37, 38. The method of the invention includes steps that address this characteristic of wavelength and wave propagation.

An impulsive source and evenly spaced receiver stations give rise to a linear variation in phase between receivers. In this case if the number of receivers exceeds the minimum necessary to determine slowness and amplitude values for each mode of interest a linear optimization method is used to minimize an error between terms representing the amplitude and phase detected at the receivers by taking both real and imaginary parts. The method can handle other source and receiver configurations such as non-impulsive frequency modulated sources and receiver stations with non-linear separations. These would give rise to non-linear variations in phase between receiver stations, and if the number of receivers exceeds the minimum necessary a non-linear optimization method may be used.

Following deployment of the logging tool 17 the or at least one acoustic source 28 present in the logging tool 17 is stimulated to emit acoustic energy pulses in a per se known manner. Typically a plurality of such pulses would be emitted, at a variety of depths along the borehole 11.

Such energy emission results in the propagation in the borehole system of plural signal energy packets exhibiting paths characteristic of at least first and second modes at least one of which is dispersive. As non-limiting examples the acoustic source(s) 28 may generate a borehole interface Stoneley wave, having dispersive slowness, and a rock formation shear wave.

The Stoneley wave travels at the fluid-borehole interface and is strongly coupled with the properties of fluid in the borehole 11, and with the properties of the formation.

The dipole source excites the fundamental formation flexural mode and higher flexural modes. The fundamental flexural mode slowness approaches the formation shear velocity at low frequency.

The invention is exemplified by reference to two wave modes but this is primarily for ease of understanding. Depending on the speed and other characteristics of the formation 12, and the type of waveform generated by the acoustic source(s) 28, in practice more than two modes may develop as mentioned above.

The emitted energy packets travel in accordance with the relevant mode properties to the receivers where they stimulate at least one receiver at each receiver station 29, 31, 32, 33, 34, 36, 37, 38 to generate at least one electrical output signal per station that is characteristic of the received energy.

Separation of Modes to Permit Mode Slowness Analysis

The output signals of the receivers include contributions from the different modes. These typically are mingled as to amplitude, frequency and phase. The method therefore seeks to separate the modes from one another in a manner permitting the extraction of useful signal components.

In order to achieve this in the embodiment shown the output signals of the receivers are transmitted using the wireline 18 to the computer 23, circuit 26 or another processing device that is capable of transforming the signals in the manner required in the method of the invention. Alternatively, as explained, the transformation and extraction steps may in other embodiments be carried out using processing equipment supported by or forming part of the logging tool 17; and yet further at least partial transmission of the log signals may take place using e.g. coded mud pulse communication.

The processing device transforms the signals into respective transformed mode signals containing phase and amplitude information of each respective mode across the array of receivers 29, 31, 32, 33, 34, 36, 37, 38. In this regard any given energy pulse emitted from the acoustic source(s) will stimulate each receiver station in sequence (in the uphole direction), thereby giving rise to a sequence of receiver outputs. Following transformation of the sequence of output signals generated across the receiver array it is possible to extract useful information on the individual mode signals.

In the transformed signals estimated phase and amplitude information are linked by an operator to the slowness and attenuation characteristics of the respective mode and the transmitter-receiver distance of the respective receiver station. This knowledge permits the slowness and attenuation characteristics to be extracted as further signals that then may be plotted, transmitted, stored, displayed, printed or otherwise further processed.

Attenuation is a frequency-dependent characteristic that can be used to discern information about subterranean conditions. The improvements in resolution, aliasing and other characteristics offered by the methods of the invention permit acoustic attenuation plots to be provided in a commercially useful form.

In practice the transformation of the receiver output electrical signals in preferred embodiments of the invention is a Fourier transformation. As is known in the art this may be achieved e.g. through simulation software operating in a computer 23, or using e.g. an analog filter and Op Amp circuit (or another design of circuit) 26. The result of such transformation is a set of further signals from which dispersive characteristic information, and in particular slowness and attenuation characteristics, can be identified.

To the foregoing ends the processing device (e.g. computer 23 or circuit 26) may be arranged such that the step of using the estimated phase and amplitude information for each mode to extract slowness and attenuation information for each mode from the output signals includes generating signals representing real and imaginary parts of the transformed mode signals containing respective amplitude and phase components of the respective modes; and minimizing an error between terms representing the amplitude and phase detected at the receivers, and terms representing amplitude and phase components in the real and imaginary parts.

In this regard, an electrical signal that has undergone Fourier transformation includes at each frequency under consideration real and imaginary parts that can be used for the purpose indicated. Such considerations are familiar to those having knowledge of the Fourier transform art.

The indicated steps in embodiments of the method include representing the real and imaginary parts as objective function signals and summing the squares of the objective function signals over the two or more receiver stations. The processing device to which the wireline 18 is connected may be designed or programmed accordingly.

There are at least two possible approaches to minimizing the error when the real and imaginary parts are represented as objective function signals as outlined. In a first embodiment the method includes using initial estimates of the amplitude and phase components of the respective modes, and using a search method to minimize the error. Such estimates may be generated in a variety of ways, as will occur to the person of skill in the art.

Alternatively it is possible to minimize the error between terms representing the amplitude and phase detected at the receivers, and terms representing amplitude and phase components in the real and imaginary parts by seeding expressions representing the signals with estimated values of the slownesses of the respective modes, and solving for values of the respective amplitudes that minimize the error.

In more detail considering the non-limiting case of two modes with slowness values SA and SB, respectively, that could for example represent Stoneley and flexural components but in which the formulation is not restricted to any particular pair of modes, the received waveform C at one receiver is:

$$C \cos(\omega t - Kx) = A \cos(\omega t - K_A x) + B \cos(\omega t - K_B x) \qquad (2)$$

where the two modes give rise to amplitudes A and B in the signal stimulated at a said receiver station 29, 31, 32, 33, 34,

36, 37 or 38, t is time in seconds, K is the spatial frequency in radians/m, x is a distance in metres (m), and $\omega=2\pi f$ is the angular frequency.

$K=2\pi k$ radians/m, where k is the spatial frequency in cycles/m.

The receiver 29, 31, 32, 33, 34, 36, 37 or 38, depending on the receiver under consideration, starts sampling as soon as the transmitter (acoustic source 28) is fired, but there is a delay in time (to) before the signal reaches each receiver in the array.

The signal can thus be written as:

$$C \cos(\omega t - Kx) = C \cos(\omega(t-t_0)) \quad (3)$$

where $t_0 = X_n/v_n$ and $X_n$ is the distance from the acoustic source 28 to the receiver in question $Rx_n$ (i.e. one of the receivers 29, 31, 32, 33, 34, 36, 37 or 38) in units of m, and $v_n$ is the velocity of the waveform in m/s. The minus sign in Equation (3) indicates the delay in time.

Velocity in m/s is related to slowness (S) in µs/ft by a conversion factor $$\left(S = \frac{\text{factor}}{v_n}\right)$$

where factor is equal to 304800.

Equation (2) can be re-written including the slowness as:

$$C_n \cos(c_n) - (A\cos(a_n) + B\cos(b_n)) = 0 \quad (4)$$

Where $$\begin{cases} a_n = \dfrac{2\pi f S_A X_n}{\text{factor}} \\ b_n = \dfrac{2\pi f S_B X_n}{\text{factor}} \end{cases} \quad (5)$$

Thus in the method of the invention the slowness and amplitude terms are linked to phase and frequency by an operator. In computational terms this makes it relatively straightforward to extract slowness and amplitude values from the transformed signals.

The method of the invention can be repeated in respect of a number of frequencies thereby giving rise to a range of slowness and amplitude values. These exhibit the dispersive nature of the slowness, with the corresponding extracted amplitude at the respective frequencies showing an attenuation characteristic. Thus the attenuation, which is directly derived from amplitude values, also is linked to the phase and frequency by an operator.

In one embodiment of the invention the method is repeated in respect of 256 frequency bins although the invention is not limited to any particular plural number of frequency bins.

The index n refers to the number of the receiver station, the numbering proceeding consecutively in the order indicated in FIG. 1, with receiver station 29 giving rise to a value of n of 1, station 31 a value of 2 and so on.

In the case of the non-limiting CXD cross-dipole acoustic logging tool mentioned above this gives rise to 8 phase values for the 8 receiver positions for each frequency bin. Each signal is represented in the frequency domain by N/2 frequency bins, where N is the number of time samples in the signal.

In the case of the CXD logging tool and Fourier transformation (FT) of the electrical signals generated at the receiver stations, at each frequency bin generated by the FT of the received signals across the array there are 8 complex samples.

The real part of the transform is: $C \times \cos(c) = A \cos(a) + B \cos(b)$; and the imaginary part of the transform is: $C \times \sin(c) = A \sin(a) + B \sin(b)$ For a given frequency the real and imaginary parts are available which provide the magnitude (C) and the phase (c). The phase is given by Equation (5).

The model in Equation (4) assumes two modes of amplitude (A, B) and slowness ($S_A$, $S_B$), and a composite received signal of magnitude (C) and phase (c) in any particular frequency bin. For the CXD logging tool used to exemplify the invention 8 values for each of (C) and (c) are generated.

Using the real and imaginary parts from the FT result for each bin where the real part is (C cos(c)) and the imaginary part is (C sin (c)), it is possible to formulate a set of error equations:

$$\begin{cases} \text{Real part:} \quad \Sigma[C_n \times \cos(c_n) - (A\cos(a_n) + B\cos(b_n))]^2 \\ \text{Imag part:} \quad \Sigma[C_n \times \sin(c_n) - (A\sin(a_n) + B\sin(b_n))]^2 \end{cases} \quad (6)$$

$$\text{where } a_n = \frac{2\pi f S_A X_n}{\text{factor}} \text{ and } b_n = \frac{2\pi f S_B X_n}{\text{factor}}$$

There are 8 pairs of equations, and the summation $\Sigma( )$ is performed over the 8 receivers. In this system of equations there are 4 unknowns A, $S_A$, B, and $S_B$, and it is desired to find the values of the 4 unknowns which minimize the total squared error.

Two ways to proceed are (noting that there may be others):

1) A search procedure. These typically use start guesses for A, $S_A$, B, and $S_B$, and the algorithm iterates to minimize the objective function. One such algorithm is the Nelder-Mead or simplex algorithm, and another is the Levenberg-Marquadt algorithm. These are suitable for problems that have a smooth response surface or when the guess is close to the true answer. Where there are many possible answers then it is necessary to iterate many times.

2) Alternatively it is valid to guess values for $S_A$ and $S_B$ and then find the values of A and B that minimize the error for that pair of slowness values. The solution for A and B given $S_A$ and $S_B$ that minimizes error has a closed form and the solution is exact:

$$\begin{cases} A = [\Sigma \, C\cos(c) \times \Sigma \, \sin(b) - \Sigma \, C\sin(c) \times \Sigma \, \cos(b)]/D \\ B = [\Sigma \, C\sin(c) \times \Sigma \, \cos(a) - \Sigma \, C\cos(c) \times \Sigma \, \sin(a)]/D \end{cases} \quad (7)$$

$$\text{Where } D = \Sigma \, \cos(a) \times \Sigma \, \sin(b) - \Sigma \, \sin(a) \times \Sigma \, \cos(b)$$

This solution given $S_A$ and $S_B$ is fast. So the processing device can be constructed or programmed simply to cycle through two "for" loops, one for $S_A$, and one for $S_B$ where each goes from say 40 to 700 µs/ft in steps of 1 µs/ft.

There are many ways to reduce the range of values for the initial slowness guess. One is to use a Phase Moveout method as described by Assous and Elkington cited above initially, and then seed subsequent depth frames with the results from the previous frame.

Both approaches have been successfully tested.

The first method finds many alias values which must be corrected for. The second method gives fewer alias values, since it is possible to restrict the search using initial guesses.

Thus given the values of the 4 unknowns at each bin it is necessary to decide which values of $S_A$ and $S_B$ are the required slowness values.

Figure 2:
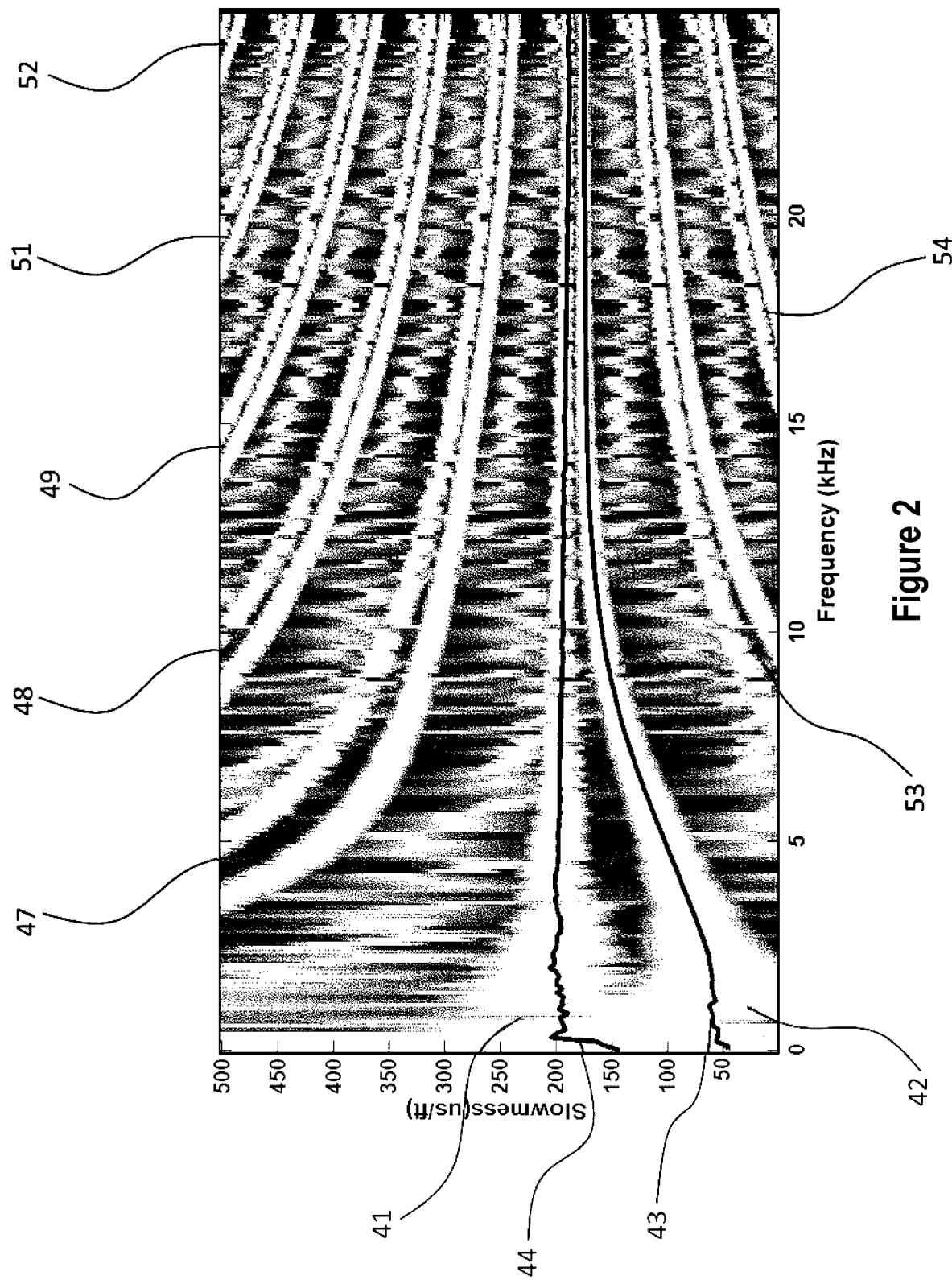
FIG. 2 is a slowness-frequency coherence plot generated using a prior art Matrix Pencil linear algebra technique illustrating flexural and Stoneley slowness, and having overlain flexural and Stoneley slowness results generated using the methods of the invention.
Figure 3B:
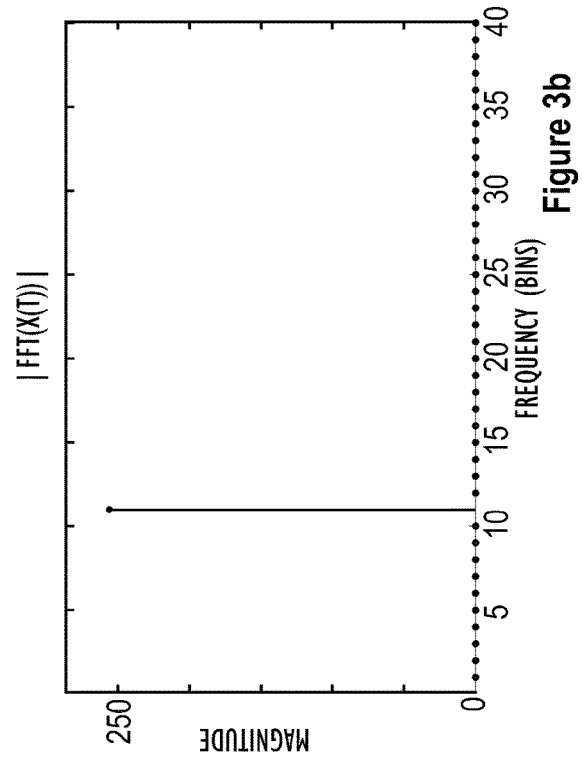
FIGS. 3a-3d show a single harmonic time series (left) and spectrum (right) in illustration of a windowing phenomenon that result from the manner in which an acoustic logging tool samples data.
Figure 3D:
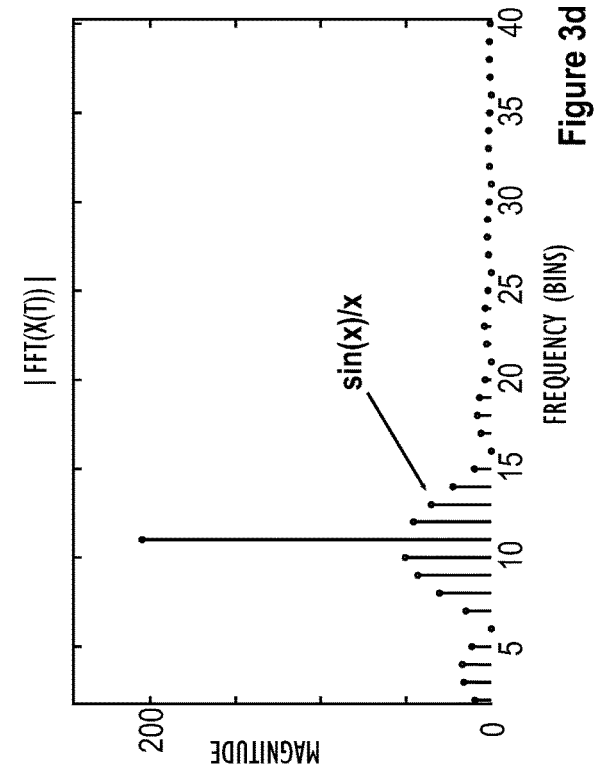
Figure 3A:
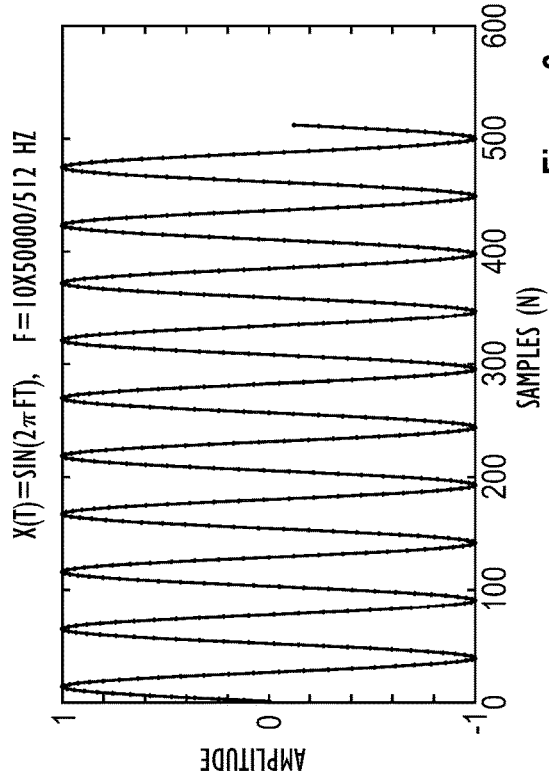
Figure 3C:
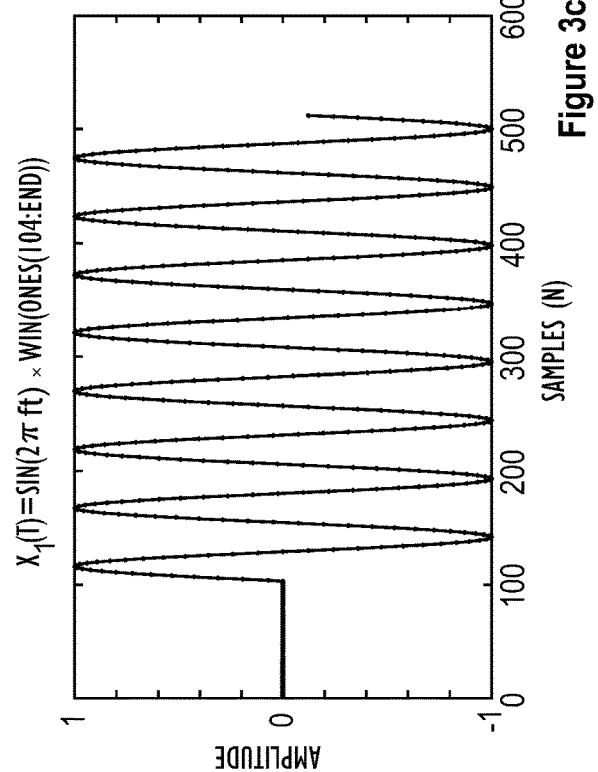
Figure 4A:
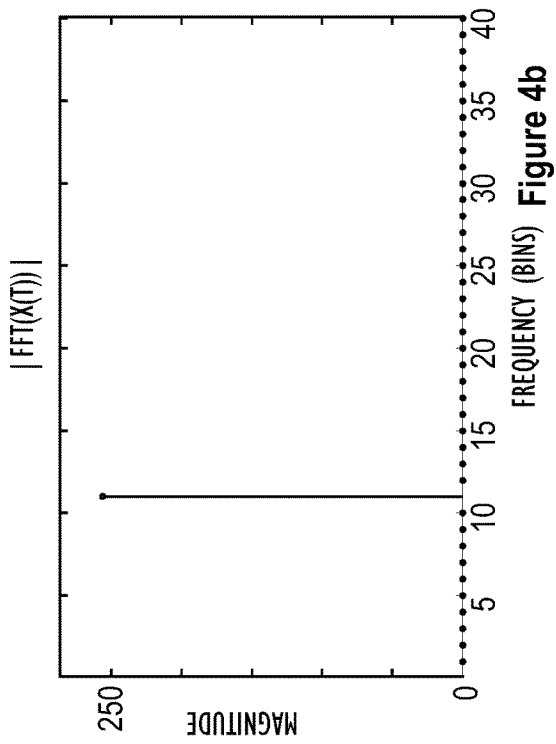
FIGS. 4a-4d show a single harmonic time series (left) and spectrum (right) in illustration of an energy leakage phenomenon.
Figure 4B:
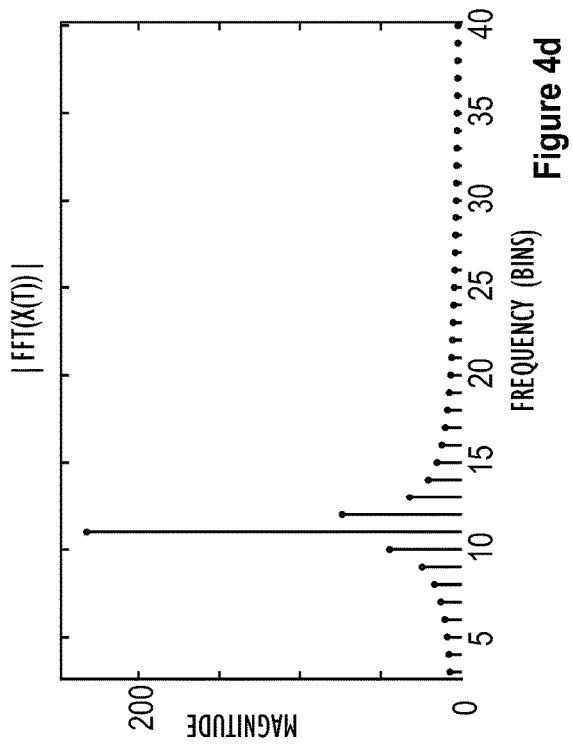
Figure 4C:
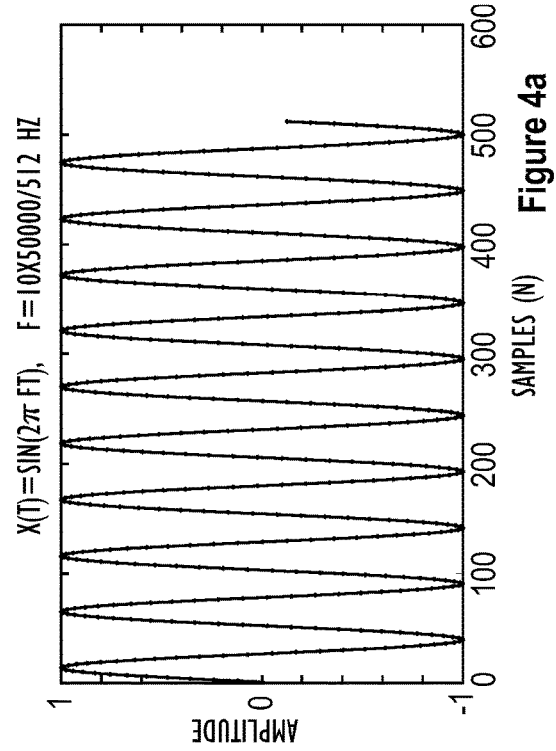
Figure 4D:
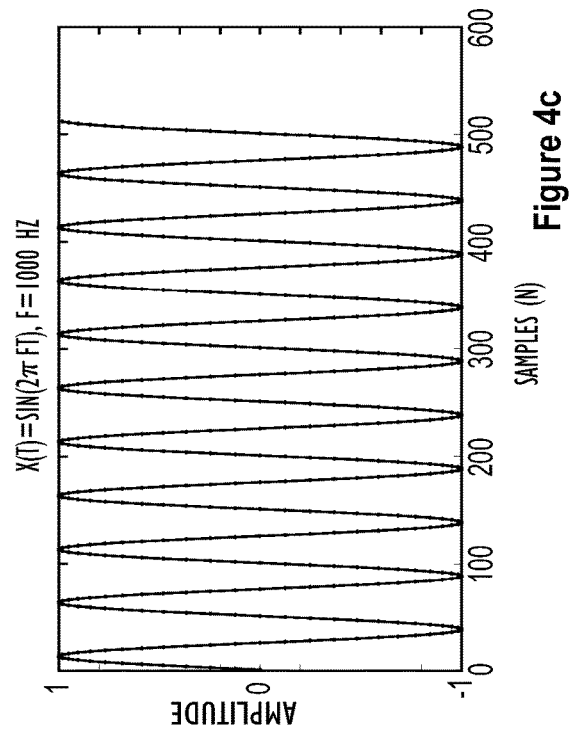

The successful use of the method of the invention to generate a unique slowness and amplitude (and hence attenuation) result at each frequency for each mode is illustrated in FIG. 2, in which the black lines 43, 44 respectively represent flexural and Stoneley slowness values determined by processing signals in accordance with the method of the invention. The closed form of the expressions representing the processing steps as explained mean that at each frequency a single slowness value results. Among other things this means there is no requirement, using the method of the invention, to interpret coherence levels from the indistinct outputs of prior art slowness-frequency coherence plots. It follows that the method of the invention generates a new form of output signal, that is a precise, single-value (at each frequency) slowness signal. This represents a major advance compared with prior art methods.

Windowing and Energy Leakage: Background

Energy leakage between frequency bands is inherent in the way array sonic logs are sampled and processed. It limits the accuracy of prior art slowness calculations, and prevents the calculation of accurate mode attenuation. Leakage occurs at frequencies that are not integer multiples of the waveform frequency resolution, and is compounded by the windowing effect associated with the time-limited nature of recorded mode signals, each mode also generally having a different start time. Moreover, the number of full cycles available at any given frequency may be too few to allow accurate estimates of amplitude and phase from Fourier analysis, and aliasing associated with Fourier is another complicating factor. An aspect of the disclosure for the first time provides a solution addressing all these issues.

In a CXD-type logging tool, considered as a non-limiting example herein and represented schematically by logging tool 17 in FIG. 1, comprising a transmitter and an array of 8 receiver stations at progressively increasing distances from the transmitter each receiver produces a waveform C containing two modes A and B with frequency-dependent slowness values $S_A$ and $S_B$, respectively. The combined waveform can be represented by the following continuous function:

$$C \cos(\omega t - Kx) = A \cos(\omega t - K_A x) + B \cos(\omega t - K_B x) \quad (8)$$

where t is time in seconds, K is spatial frequency in radians/m, x is distance in metres (m), and $\omega = 2\pi f$ is angular frequency. $K = 2\pi k$ radians/m, where k is the spatial frequency in cycles/m. The mode labels A and B are arbitrary and are used simply to signify that two mingled mode signals result from operation of the logging tool.

In the case of the dipole CXD each waveform contains N=512 samples sampled at a sampling frequency Fs=50 kHz. The Fourier transform of each waveform contains 256 frequency bins between 0 Hz and Fs/2 Hz with step (i.e. frequency resolution) Fs/N. The 256 frequency bins are complex and represent the combined magnitudes and phases of the two modes A and B. Each receiver starts sampling at the same time, assumed to be the time that the transmitted pulse leaves the transmitter of the logging tool 17.

Prior to the arrival of transmitted energy at the first receiver the waveform contains no signal (noise being neglected), and energy arrives at progressively later times at successive receivers. Each of the time-limited waveforms is equivalent to the infinite time series C $\cos(\omega t - Kx)$ cross-multiplied by a square-wave signal (a time window, i.e. a time-varying function) for each mode. In the case of two modes there are two square wave signals whose values are 0 before the mode signal appears in the receiver, and 1 thereafter. In the general case of modes with different slowness values, the square waves start at different times.

The amplitudes and phases of A, B and C (C as explained representing the signals generated at the receivers making up the receiver stations 29, 31, 32, 33, 34, 36, 37 and 38) obtained by Fourier transform are affected by the Gibbs phenomenon associated with the windowing. Moreover, the number of full cycles available at any given frequency may be too few to allow an accurate estimate of amplitude and phase from Fourier for C $\cos(\omega t - Kx)$ in the corresponding bin. The disclosure provides a least squares solution for amplitudes and phases in which the windowing and number of cycles issues are handled explicitly.

An exact solution for all 256 frequency bins which considers the contamination in each bin from every other bin is computationally expensive, and may not be practical. However, slowness solutions with accuracy superior to that from legacy processing are possible by considering contamination from each bin's immediate neighbors. The following investigates the relationship between the number of bins that can be considered in the contamination calculation, and the maximum number of modes that are resolvable using the approach for a given array geometry.

As mentioned the frequency contamination has two sources. One is related to the square wave (windowing, i.e. the Gibbs phenomenon), and the other is related to leakage associated with frequencies other than those that are integer multiples of Fs/N.

The impact of windowing is illustrated in FIGS. 3*a*-3*d* in which (in order to isolate for purposes of illustration the windowing effect from the non-integer multiple one) the single frequency considered is an integer multiple m of Fs/N. The continuous signal (top plots of FIGS. 3*a*-3*b*) has a peak energy of 256 exactly, and the frequency corresponds to bin (m+1)=11 and is 976.5625 Hz exactly. As explained, acoustic log signals are not continuous; but are time-limited because the energy associated with each mode is zero until it arrives at each receiver. This is equivalent to multiplying a continuous signal by a square window with coefficients of zero before the signal arrives, and 1 thereafter. In the example, the first non-zero signal value appears at sample 101 (bottom plots of FIGS. 3*c*-3*d*). The peak energy is reduced from 256 to 206 units as a result of the windowing effect, and the corresponding spectrum is a sinc-like function which contains energy from both the signal and the square window.

The impact of leakage is illustrated in FIGS. 4*a*-4*d* which show an example continuous frequency of 1000 Hz. This is inside bin 11 but is not an integer multiple of Fs/N. This causes energy to leak into neighboring bins, and in this case reduces peak energy from 256 to 231. In the example sonic logging tool 17 the frequency resolution is 50000/512=97.65625 Hz, and the energy from frequencies that are not integer multiples of this leaks into side-bands. The example shows the effect for a single frequency, but in general leakage impacts all 256 bins and the signals from all receivers. In FIGS. 4*a*-4*d* the effect of the time-limited nature of signal generation at the receiver stations is not illustrated, in order to make clear the nature of leakage caused by the non-integer multiple effect. In practice of course the phenomena illustrated by both FIGS. 3*a*-3*d* and 4*a*-4*d* would be present in the majority of cases.

Windowing and Energy Leakage: Solution

For ease of explanation the solution disclosed herein to the windowing and energy leakage phenomena initially confines the contamination correction calculation to 3 bins at a time, noting that expanding the scheme to more bins at a time may be possible but delivers diminishing returns in terms of increased accuracy. The exemplary solution described herein illustrates the method with respect to two modes referred to as A and B. As mentioned these may be any modes. As explained below, the disclosed method is not limited to solving for two modes and larger numbers of modes can be handled.

Considering $bin_i$ plus two adjacent bins: $bin_{i-1}$ and $bin_{i+1}$, the real and imaginary parts of $C_i$ are influenced by all 3 bins, and $C_i$ will not contain the true energy for $bin_i$ because of the contributions from $bin_{i-1}$ and $bin_{i+1}$. It is necessary to find the energy (signal sub-component) contributions from the side-bins and then compensate for them to obtain the true $C_i$.

The method of the disclosure assumes that initial estimates for mode slowness values $S_{Ai-1}$, $S_{Ai}$, $S_{Ai+1}$, and $S_{Bi-1}$, $S_{Bi}$, $S_{Bi+1}$ for modes A and B for the three bins are available. Each of the magnitudes of $C_i$ has six contribution values related to the two modes A and B. The initial slowness estimates need not be accurate, but the final solution is obtained more quickly if they are close to the true slowness dispersion values. The initial slowness estimates, the distance from transmitter to first receiver and inter-receiver spacings allow an estimate of the time of arrival of each mode to be inferred, and therefore the time corresponding to the start of each mode time window. Initial estimates of the amplitudes within each mode are also made; and final amplitudes are used to estimate mode attenuation. The initial amplitude estimate can be as crude as assuming an initial value of 1.

Using the time delay associated with each of the three bins and the estimated amplitudes for the two modes, it is possible to reconstruct the corresponding signals and apply Fourier (i.e. perform a Fourier transform of the signals) to generate six pairs of corresponding magnitude estimates (real and imaginary parts). Using Fourier in this way is computationally inefficient, so in practice an analytical model is used to generate the corresponding six pairs of real and imaginary magnitudes without reconstructing the bin signals and employing Fourier. This is described in outline below.

In principle, leakage can be avoided by controlling the frequency content of the transmitted signal in order to ensure that only integer multiples of the frequency resolution Fs/N are present. In practice, however, current generation logging tools do not provide for such frequency control. In order to correct for the leakage effect associated with frequencies that are not integer multiples of the frequency resolution it is necessary to calculate the amount of energy in each bin that leaks to the adjacent bins. Although each bin is contaminated by every other bin, a first order correction can be made for each bin by considering just two immediately adjacent bins (one either side). The correction can consider a larger number of adjacent bins at the cost of fewer independent terms in the calculation and/or solving for fewer modes, a reasonable compromise for a two-mode solution being four adjacent bins (two either side of each bin of interest). The disclosure however is not limited to these specific numbers of bins.

The real and imaginary amplitudes for each frequency from each receiver are obtained from Fourier processing and inserted in a matrix [A]. Equation (9) below shows A for a tool with 8 receiver stations in which 2 modes A and B are considered, and leakage correction uses three bins as mentioned. In this case A comprises 16 rows and 6 columns, and the disclosed method solves for the system Ax=C, where C and x are the observed and true amplitudes respectively. The method loops though a range of slowness estimates and refreshes the matrix [A] until the L2 norm error $\|Ax-C\|_2$ is minimized in a least square sense. At this point the minimum error solution for slowness values and the amplitudes of the two modes A and B for the three bins is output; then the same process is repeated iteratively for the next three bins and so on until all the bins are processed. In order to minimize the number of calls to a Fourier transform, the leakage correction is implemented using a mathematical model, as mentioned.

Equation 9 is:

$$\begin{bmatrix} A_{i-1}^{R1} & B_{i-1}^{R1} & A_i^{R1} & B_i^{R1} & A_{i+1}^{R1} & B_{i+1}^{R1} \\ A_{i-1}^{I2} & B_{i-1}^{I2} & A_i^{I2} & B_i^{I2} & A_{i+1}^{I2} & B_{i+1}^{I2} \\ A_{i-1}^{R3} & B_{i-1}^{R3} & A_i^{R3} & B_i^{R3} & A_{i+1}^{R3} & B_{i+1}^{R3} \\ & & \vdots & & & \\ & & \vdots & & & \\ A_{i-1}^{I6} & B_{i-1}^{I6} & A_i^{I6} & B_i^{I6} & A_{i+1}^{I6} & B_{i+1}^{I6} \\ A_{i-1}^{R7} & B_{i-1}^{R7} & A_i^{R7} & B_i^{R7} & A_{i+1}^{R7} & B_{i+1}^{R7} \\ A_{i-1}^{I8} & B_{i-1}^{I8} & A_i^{I8} & B_i^{I8} & A_{i+1}^{I8} & B_{i+1}^{I8} \end{bmatrix} \times \begin{bmatrix} x_1 \\ x_2 \\ x_3 \\ x_4 \\ x_5 \\ x_6 \end{bmatrix} = \begin{bmatrix} C^{R1} \\ C^{R2} \\ C^{R3} \\ \vdots \\ C^{I6} \\ C^{I7} \\ C^{I8} \end{bmatrix} \quad (9)$$

where the superscripts reflect real (R) or imaginary (I) amplitudes and receiver number for the amplitudes A and B of the two modes and also for the combined amplitudes C calculated from Fourier processing. The equation is solved in a least square sense. There are 16 values to solve for, and the solution gives 6 answers for the two modes A and B for the three bins with the exact contribution of each bin and also the corresponding slowness values.

The least squares solution does not generate aliases which are a feature of prior art methods based on Fourier. The disclosure further relates, below, to techniques for eliminating aliasing.

In summary, the algorithm or method for processing signals representative of three bins at time is:
  For each frequency bin and its immediate neighbors estimate slowness values for the two modes A and B, and knowing the transmitter-receiver separation generate arrival time estimates for each mode for each bin ($S_{Ai-1}$, $S_{Ai}$, $S_{Ai+1}$, and $S_{Bi-1}$, $S_{Bi}$, $S_{Bi+1}$).
  For each bin compensate for leakage assuming the initial amplitudes equal 1.
  Generate the corresponding set of six real and imaginary magnitudes and populate the rows of the matrix [A] in Equation (9) using the corresponding sub-routine.
  Repeat this process for all the eight receivers giving 16 rows (pairs of real and imaginary values) of the matrix.
  Solve the system Ax=C in a least squares sense using the Nelder-Mead algorithm. This may be done for example using the $f_{min}$ search function in Matlab or in other ways as will occur to the person of skill in the art.
  For each iteration, save the corresponding amplitudes and slowness values.
  Stop when the minimum error solution is found and output the corresponding amplitudes $x_1 \ldots x_6$ and the corresponding slowness values $S_{Ai-1}$, $S_{Ai}$, $S_{Ai+1}$, $S_{Bi-1}$, $S_{Bi}$, and $S_{Bi+1}$ Move to the next three bins repeatedly until all the bins have been processed.

Generate and/or output the slowness and amplitude values for each mode for each bin.

(Optionally) generate the waveforms for each mode and reconstruct the original waveforms in order to quality control the results.

The sub-routine to compensate for the leakage is as follows. Assuming it is required to obtain the contribution of Bin (i−1) to Bin (i), for Bin (i) the disclosed method reconstructs the single frequency signal corresponding to that bin with the corresponding slowness $S_{Bi}$ (time delay), then applies the fast Fourier transform (FFT), looks to the contribution of Bin (i−1) and compensates for it in bin (i) and so on. The single frequency has the same number of samples that are present in the original signal, and is sampled using the same sampling rate.

It is possible to show that the method of the invention determines the leakage and windowing values and reconstructs the true signals to a high degree of accuracy. In summary the sub-routine for the leakage correction disclosed herein is the following:

For each waveform from the array apply the FFT to obtain the C magnitudes

For each frequency bin, knowing the transmitter-receiver distances and slowness estimates, reconstruct the single frequency time series corresponding to that bin and apply the FFT over the same length as the original signal to estimate the contribution of the other bins to the bin of interest.

Correct for the magnitude in C knowing the magnitudes of the different modes (e.g. A and B) for each bin Pass the results into the system Ax=C The example uses three bins, two modes and 16 equations from eight in-line receivers to solve six unknowns in a least squares algorithm. Alternative implementations can further refine the leakage compensation, or increase the number of modes in the solution. Increasing the number of bins in the leakage correction and increasing the number of modes both increase the number of unknowns. To keep the problem solvable in a least square sense for two modes it is reasonable to consider up to seven bins (which requires 14 unknown amplitudes), and to solve for three modes four bins would be taken into consideration.

In some circumstances it may be possible to increase the number of points in the least squares solution. This could be used to make a two mode solution more robust to noise, or to increase the number of modes calculated, or to further improve the leakage correction (noting diminishing returns from more than three bins at a time). Crossed dipole tools have at least four longitudinal arrays (i.e. four receivers per station), and in isotropic formations the slowness values from each longitudinal array should be the same. For tools in which the two dipole transmitters are separated in depth (such that signals received in the X and Y directions are independent even in isotropic formations), using data from two longitudinal arrays increases the system to 32 equations, and data from all four arrays produces 64 equations.

In the case of dipole data, the Stoneley signals in receivers 180 degrees apart are in-phase but the flexural signals are out-of-phase. Hence the waveforms will be different and the system Ax=C is not redundant with 32 equations. In this case for the two-mode situation one may consider up to 15 bins (bin in the centre and up to seven each side). For the three modes case it would be possible to consider 10 bins in one go.

It is possible to increase the resolution even further and reduce the leaked energy by changing the configuration of the receivers. The four receivers per station configuration (A, B, C, and D) is to allow Stoneley to be cancelled in the differenced waveforms (A-C) and B-D). However, in principle it is possible increase resolution by distributing the receivers in a helical pattern separated in depth by ¼ of the conventional receiver spacing. In this way the logging tool would produce 32 waveforms. These could be solved for three modes and 10 bins in a least square sense.

Analytical Model

As mentioned, as an alternative to repeated calling of an FFT subroutine (which may be computationally burdensome) it is possible to make use of an analytical model. This uses a pre-computed and saved look-up table of all possible FFT's that might need to be interrogated to correct for windowing and energy leakage.

Each time-sampled signal has N samples, and the corresponding FFT has N/2 samples. Each of the N/2 samples is contaminated by energy in the other samples. The relative proportions of energy in each frequency band/bin follow a sinc-like distribution, as explained. There are N/2 positions for the main peak and side lobes of that distribution, so the look-up table has dimensions 256×256 in the non-limiting embodiment under consideration. The absolute amplitudes in each band fall out of the iteration of the matrix calculation.

In the temporal domain, the start time of the window (that is equivalently multiplied by a continuous signal to realize the observed signal which is zero before the mode energy arrives) is also being taken into account. The contaminating effect of the window and finite frequency resolution on amplitude estimation is large, but is small on slowness estimation. To obtain accurate mode amplitudes (for mode signal reconstruction and for attenuation) the matrix is filled and in the absence of the analytical model iteration occurs to reach a least squares solution; and the use of the model obviates the potential inconvenience of multiple iterations. Other ways of avoiding multiple FFT iterations to transform the signals may occur to the person of skill in the art.

Aliasing Elimination

In addition to the foregoing the methods of the invention for the first time permit the effective elimination of aliases in the log outputs. As explained these are undesirable.

In this regard embodiments include a method of processing one or more output signals of two or more receivers such as receivers 29, 31, 32, 33, 34, 36, 37, 38 defining an array of receivers of an acoustic logging tool 17, the receivers being sequentially spaced along the logging tool 17 from an acoustic source 28, the logging tool 17 extending in a borehole 11 intersecting a formation 12 having a dispersive slowness characteristic, the receivers 29, 31, 32, 33, 34, 36, 37, 38 being spaced from one another by one or more known distances $X_1 \ldots X_n$, n≥1, defining at least a first spatial sampling frequency $1/X_1$, giving rise to at least a first spatial frequency resolution $1/X_1/n$ of the logging tool, the method comprising the steps of:

q) for each of two or more numbered frequency bins representing a respective output signal frequency, separating the or each output signal into a plurality of spectrum signals each being characterized by a value of amplitude, spatial frequency and phase, the phase being linked by a first relationship to the frequency-specific slowness of the formation 12, the output signal frequency and the distance of each receiver from the acoustic source 28;

r) in respect of two or more frequency bins, using a second relationship linking the slowness of the formation 12, the spatial frequency resolution of the logging tool 17 and the number of the bin to determine minimum and maximum slowness values that are resolvable at the output signal frequency represented by the bin;

s) determining slowness results using the first relationship; and t) eliminating from the slowness results any slowness values less than the minimum slowness and any slowness values greater than the maximum slowness resolvable at the output signal frequency represented by the said bin.

The method of this aspect of the invention therefore beneficially makes use of the signal transformation effected in respect of the first aspect of the invention in the elimination of aliases from the signals that are output from the apparatus of the invention.

Optionally the method of the second aspect of the invention includes the steps of, before Step (q), inserting into a borehole 11, forming part of a borehole-formation system 11,12 in which the borehole 11 penetrates a rock formation 12, an elongate acoustic logging tool 17, the acoustic logging tool 17 including at least one dipole acoustic source 28; and causing the acoustic source 28 to emit acoustic energy in a manner (I) effecting the propagation in the borehole-formation system 11, 12 towards the receiver stations 29, 31, 32, 33, 34, 36, 37, 38 of plural signal packets exhibiting paths characteristic of at least first and second respective modes one or more of which is dispersive and (II) stimulating at least one receiver of each sequential receiver station 29, 31, 32, 33, 34, 36, 37, 38 to generate at least one output signal per receiver station that is indicative of the signal packets, received at the at least one receiver of each respective receiver station 29, 31, 32, 33, 34, 36, 37, 38, representing the modes in combination with one another.

Note that the foregoing steps are optional because the alias removal method forming part of the invention can if desired be practiced in respect of pre-existing log signals. Thus the generation of the acoustic log signals is not an essential feature of the basic steps of alias removal.

Furthermore in common with the first aspect of the invention the alias removal steps may be practiced in a single-sided manner, that is with the individual receivers of a receiver station being treated independently of one another, with no requirement for the signals of one receiver to be used in combination with the signals of any other before the method can successfully be practiced.

The following exemplifies alias removal according to the invention with reference to the CXD cross-dipole acoustic logging tool.

The exemplary CXD acoustic logging tool 17 has 8 receiver stations spaced 0.2 m apart along the in-use uphole end of the logging tool body. This means the spatial sampling frequency $k_s$ (analogous to the sampling frequency $F_s$) is 5 samples/m and the spatial frequency resolution is $k_s/8=0.625$ cycle/m. There are n×k spatial frequencies available, where n=1 . . . 8 and k=0.625, 1.25, . . . 5 cycles i.e. there are 8 spatial frequency bins.

Using the FT the lowest frequency $k_{min}=f\,S_{min}/\text{factor}$, where $S_{min}$ is the corresponding minimum slowness, $k_{min}=0.625$ cycles/m, and $f=f_{res}\times\text{bin}$. Note this omits the $2\pi$ term since this would give radians.

This equation can be rewritten as $$S_{min} = \frac{k_{min} \times \text{factor}}{f_{res} \times \text{bin}} = \frac{0.625 \times 304800}{\frac{50000}{512} \times \text{bin}} = \frac{1950.72}{\text{bin}} \quad (10)$$

Where 50000 is the sampling frequency $f_s$ in Hz, 512 is the number of time samples per waveform, $f_{res}=f_s/N=50000/512=97.65625$ Hz is the frequency resolution mentioned earlier, and "bin" is the frequency index under consideration (one of 256 bins in the example, although as explained other numbers of bins are possible).

Considering bin 10, $S_{min}=1950.7/10=195.07$ μs/ft. This is the minimum slowness visible in the bin at 976.5626 Hz.

Similarly, for the maximum spatial frequency (5 cycles/m), $S_{max}=15605.76/\text{bin}$. This means that, for example, in bin 100 it is possible to see slowness values equal to $S_{max}$, plus alias values equal to $S_{max}+/-156.0576$, $S_{max}+1-2\times156.0576$, etc. . . .

To illustrate this with some synthetic data, consider 2 modes such that one represents the flexural and the other the Stoneley, using the convenient equation form:

$$\begin{cases} \text{Mode } A: & S_A = 75 \times \tanh(0.02 \times (\text{bin} - 50)) + 100 \\ \text{Mode } B: & S_B = -0.05 \times \text{bin} + 200 \end{cases} \quad (11)$$

where the amplitudes of modes A and B are random values in the range 0.1 to 1.1. Note this is just a convenient way to achieve realistic-looking flexural and Stoneley modes found in dipole acoustic waveforms, and does not imply any underlying physics.

Figure 5A:
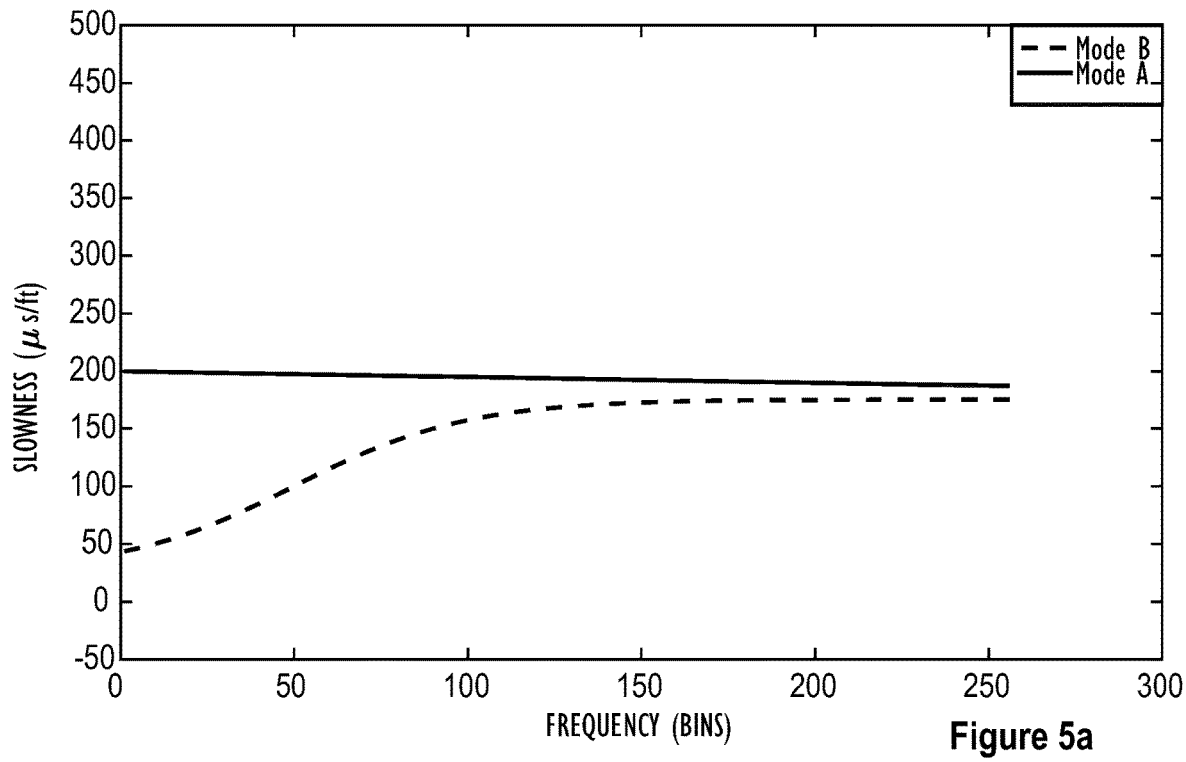
FIGS. 5a and 5b assist to explain the phenomenon of aliasing that is encountered in prior art methods.
Figure 5B:
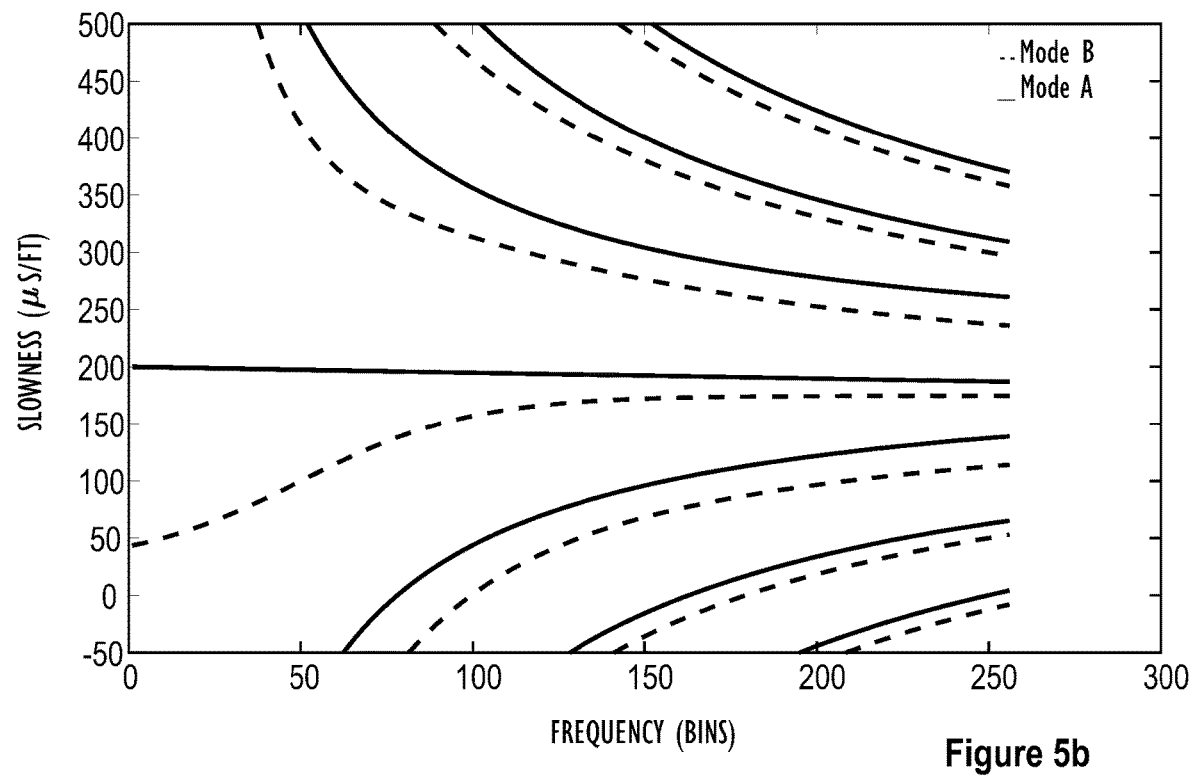

FIG. 5*a* shows the two dispersion (slowness-frequency) curves, and FIG. 5*b* shows the curves with aliasing in the 0 to 500 μs/ft range, respectively. Another important point which will become useful in practical terms when considering the CXD tool example is that below 500 μs/ft aliasing does not occur below bin=15605.76/500=31, which is borne out by the evidence in the plots. The methods of the invention thus in addition to generating highly precise slowness signals provide a clear prediction of where aliases will occur. The precise identification of aliases allows their ready elimination using per se known suppression techniques. When the method of the invention is put into effect using a programmable processing device such information moreover permits the alias energy to be added to the calculated slowness signals in the correct locations, since these locations are uniquely determined as explained and moreover are tied to the aliases they are responsible for. As a result the signal-to-noise ratio of the signals generated by the methods of the invention may be improved compared with the prior art.

Although in the CXD cross-dipole logging tool example discussed the inter-receiver distance along the logging tool between each adjacent pair of the receiver stations is the same, it requires relatively minor adjustment of the method steps to take account of logging tool receiver spacings that are unequal from one receiver station to the next. Similar relative minor adjustment of the method steps can take account of signals from tools which excite the formation with acoustic signals having non-linear phase characteristics. The invention includes such adjusted versions of the method within its scope.

As is implied by the foregoing, Steps q), r), s) and t) typically would be repeated in respect of a range of frequencies of the respective output signals.

At least the step q) of separating the or each output signal into a plurality of spectrum signals may be performed using a programmable processing device such as computer 23, or an electronic circuit such as circuit 26.

For the avoidance of doubt the invention as disclosed herein extends to (but is not limited to) a borehole-apparatus system 10 comprising (A) a borehole 11 penetrating a rock formation 12; (B) an elongate acoustic logging tool 17, the acoustic logging tool including at least one acoustic source 28 and, spaced from the acoustic source 28 along the logging tool 17, a sequential array of acoustic signal receiver stations 29, 31, 32, 33, 34, 36, 37, 38, the receiver stations 29, 31, 32, 33, 34, 36, 37, 38 each including at least one receiver and being spaced along the logging tool 17 from the acoustic source 28 by successively greater known transmitter-receiver distances $x_1$, $x_2$, etc., the acoustic source 28 being capable of emitting acoustic energy in a manner (i) effecting the propagation in the borehole-formation 11, 12 system towards the receiver stations 29, 31, 32, 33, 34, 36, 37, 38 of plural signal packets exhibiting paths characteristic of at least first and second respective modes one or more of which is dispersive and (ii) stimulating at least one receiver of each sequential receiver station 29, 31, 32, 33, 34, 36, 37, 38 to generate at least one output signal per receiver station that is indicative of the signal packets, received at the at least one receiver of each respective receiver station, representing the modes in combination with one another; and (C) one or more processing devices 23, 26 that is operatively connected to the acoustic logging tool 17 and is capable of carrying out in respect of the output signals at least Steps (c) to (d) of the Summary of the Disclosure and/or Steps i) to l) of the Summary of the Disclosure and/or Steps q) to t) of the Summary of the Disclosure. Optionally the or at least a said processing device may be an electronic circuit 26 or a programmable device such as computer 23.

The processing device may be operatively connected to one or more of a plotter, printer or display device, exemplified non-limitingly by displays 24, 27 in FIG. 2, that is capable of displaying a graphical representation of the slowness or attenuation of one or more slowness and/or attenuation characteristics generated by the one or more processing devices. At least one said graphical representation may be or may include a dispersion plot such as plots 43 and 44 although numerous other forms of plot also are possible within the scope of the invention.

The acoustic source 28 optionally may be or may include a dipole acoustic source whose output may have linear or non-linear phase characteristics. Preferably but not essentially the spacings between the receiver stations 29, 31, 32, 33, 34, 36, 37, 38 are the same as one another.

In embodiments the invention includes operatively connected or connectable to the processing device one or more storage device that is capable of storing one or more values of slowness and/or attenuation generated by the processing device. In FIG. 2 such a storage device is represented by flash memory drive 46 that is plugged in to computer 23 via a port; but it is equally possible to conceive of memory devices that are suitable for recording signals and/or data generated by the electronic circuit 26. The storage device is not limited to the flash memory type shown and may take any of a range of forms.

The apparatus of the invention optionally includes a computer-readable storage medium comprising instructions which, when executed by a computer, cause the computer to carry out at least Steps c) and d) of the Summary of the Disclosure and/or at least Steps i) to m) of the Summary of the Disclosure and/or Steps q) to t) of the Summary of the Disclosure. Such a computer-readable medium also is exemplified in FIG. 2 by the flash memory 46, although this feature also may take a range of other forms as would be known to the person of skill in the art. The computer-readable medium and the storage device do not have to be embodied in a single device as illustrated; and the functions of such components may be shared among plural devices. Embodying such aspects is within the ability of the person of skill in the art.

As explained the apparatuses of the invention are capable of operating invertibly as described herein. This is a major benefit since it is possible to verify the accuracy of the methods and the correct operation of apparatuses by reversing the method steps when the originating signal components are known. Such steps are not believed to be possible in respect of slowness-coherence methods known in the prior art.

The methods and apparatuses of the invention represent a significant advance in the operation of acoustic logging tools and the processing of signals generated by them. The transformation and subsequent manipulation of the signals output by the receivers of the logging tool give rise to new signal forms that as explained are likely to be highly useful in the logging tool art.

Figure 7A:
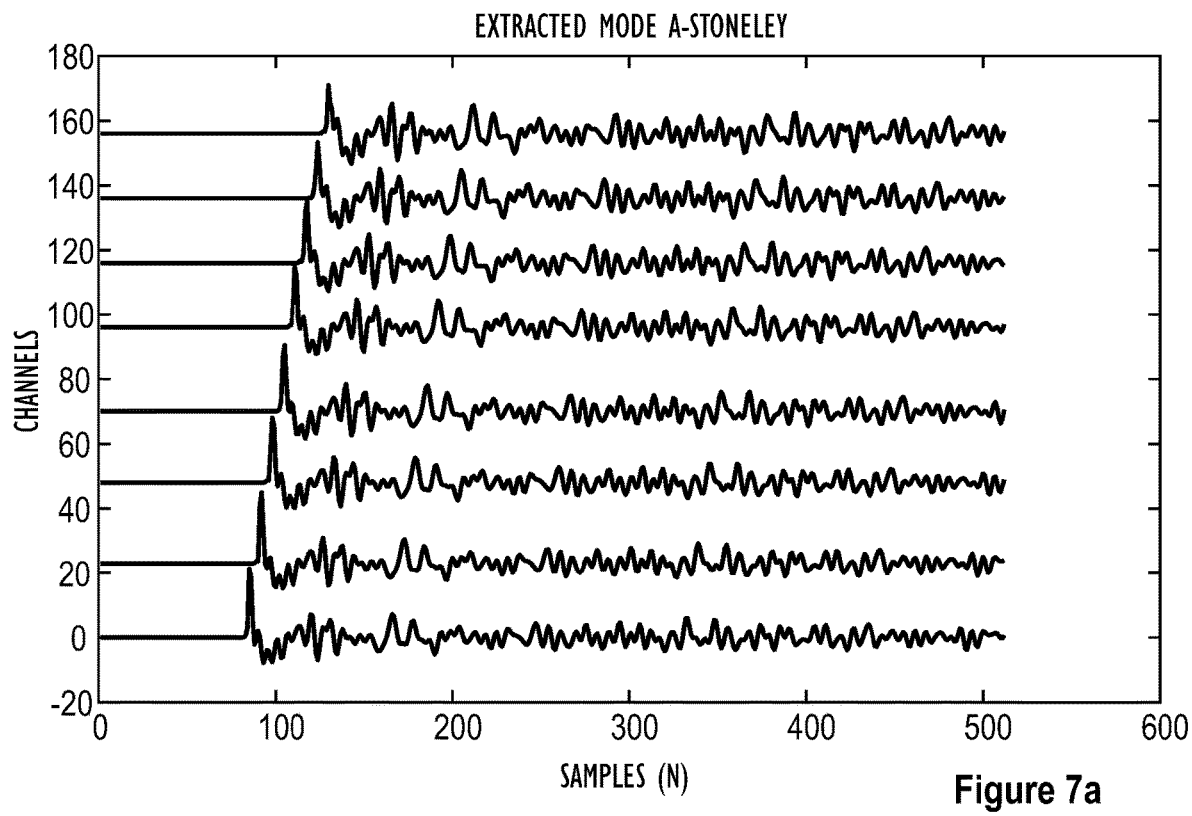
FIGS. 7a and 7b illustrate separated mode waveforms that exemplify certain outputs available using methods disclosed herein.
Figure 7B:
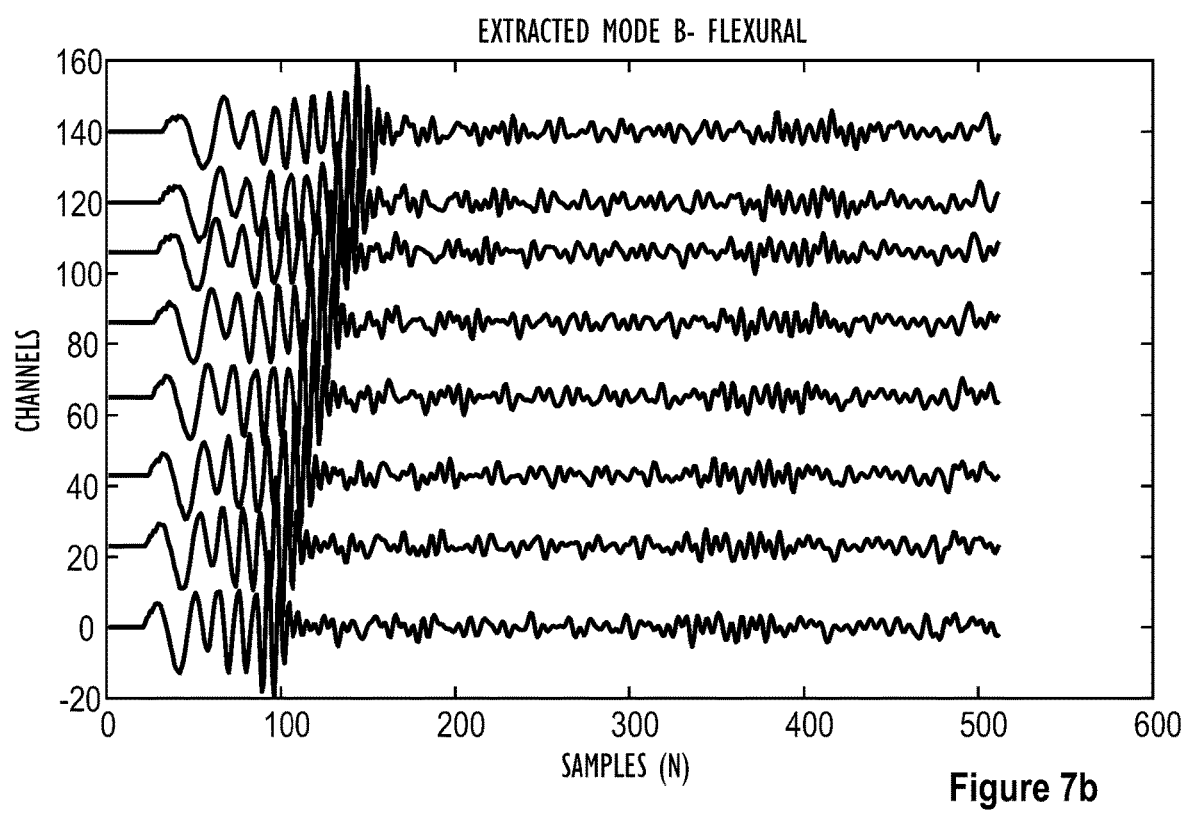
Figure 8:
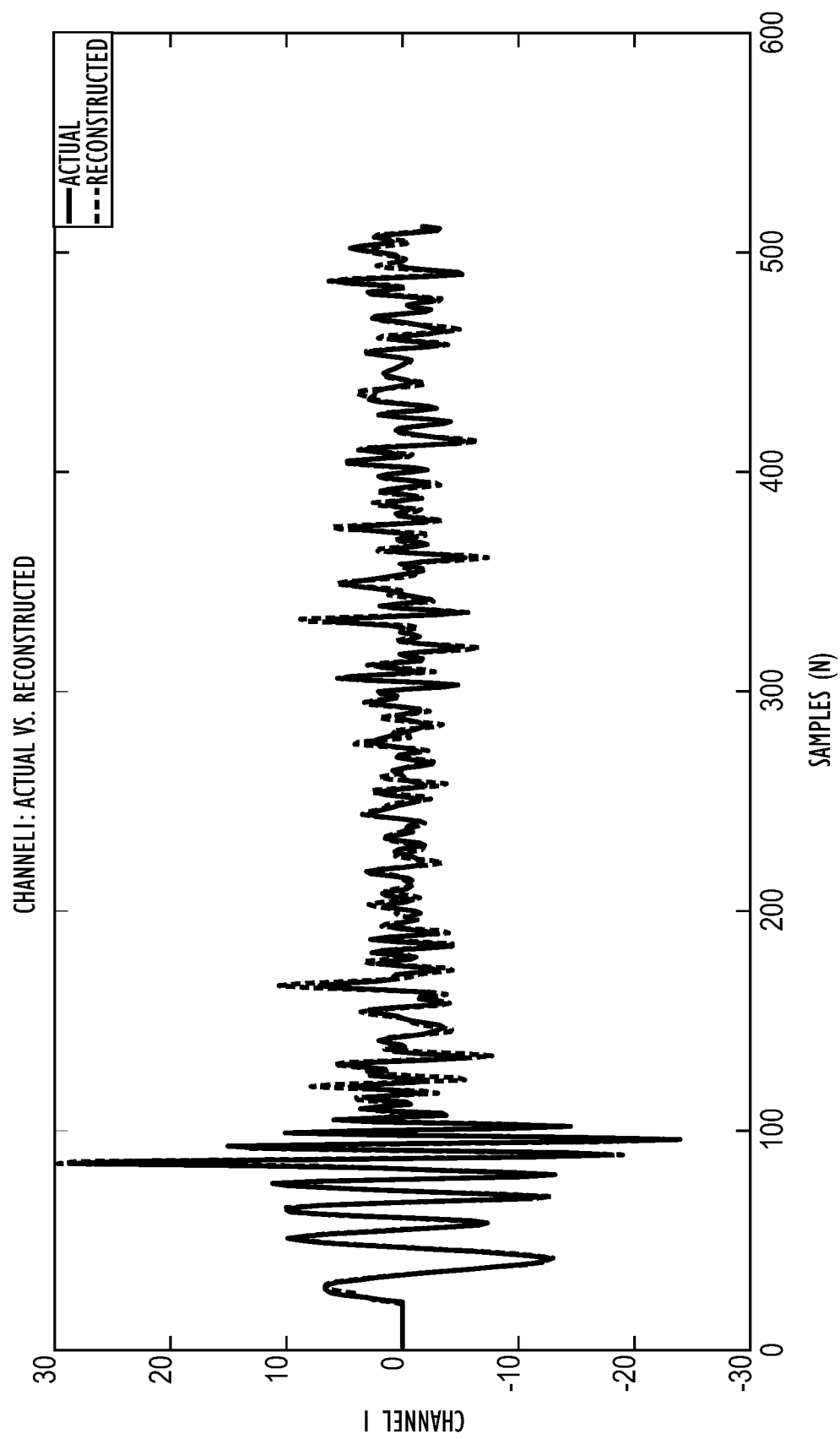
FIG. 8 shows the result of reconstructing of a waveform from outputs of the method, illustrating the accuracy achievable.

FIGS. 6 to 8 illustrate the high quality of the results that may be achieved using methods as disclosed herein.

Figure 6A:
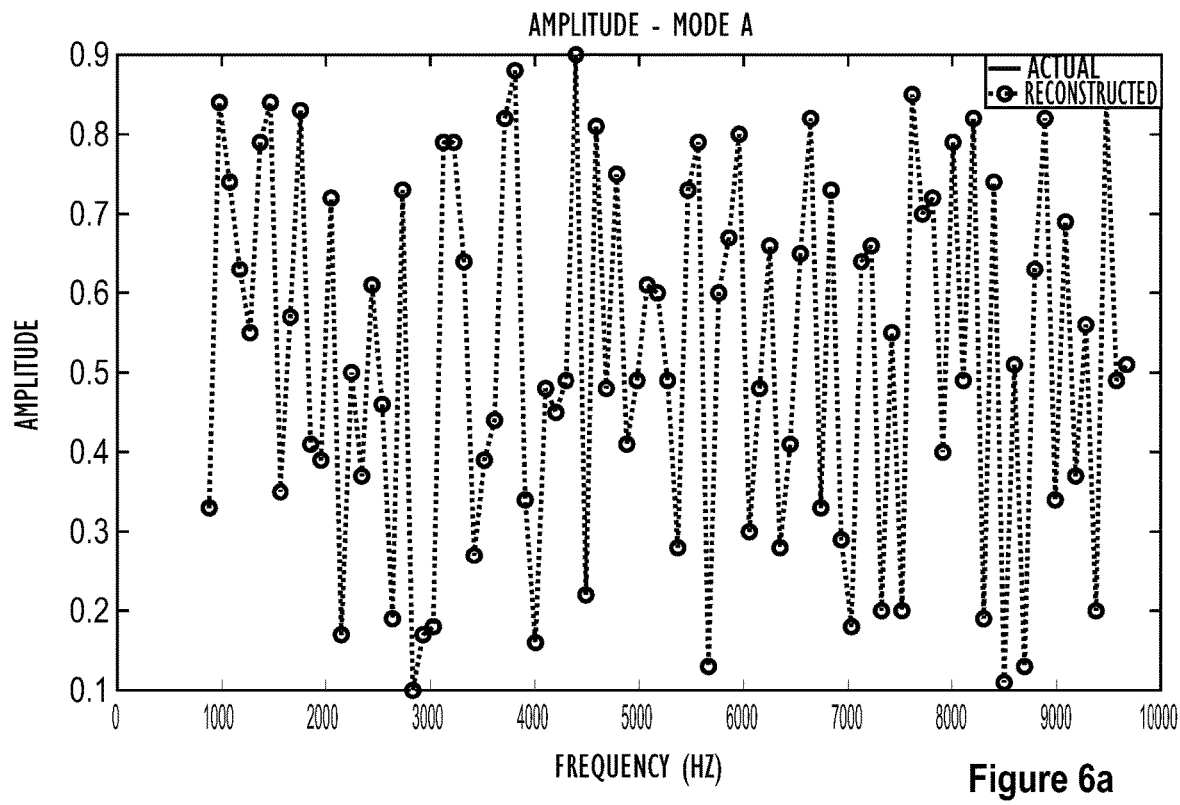
FIGS. 6a and 6b are plots illustrating the accuracy of methods disclosed herein in extracting dispersive amplitudes of multiple modes.
Figure 6B:
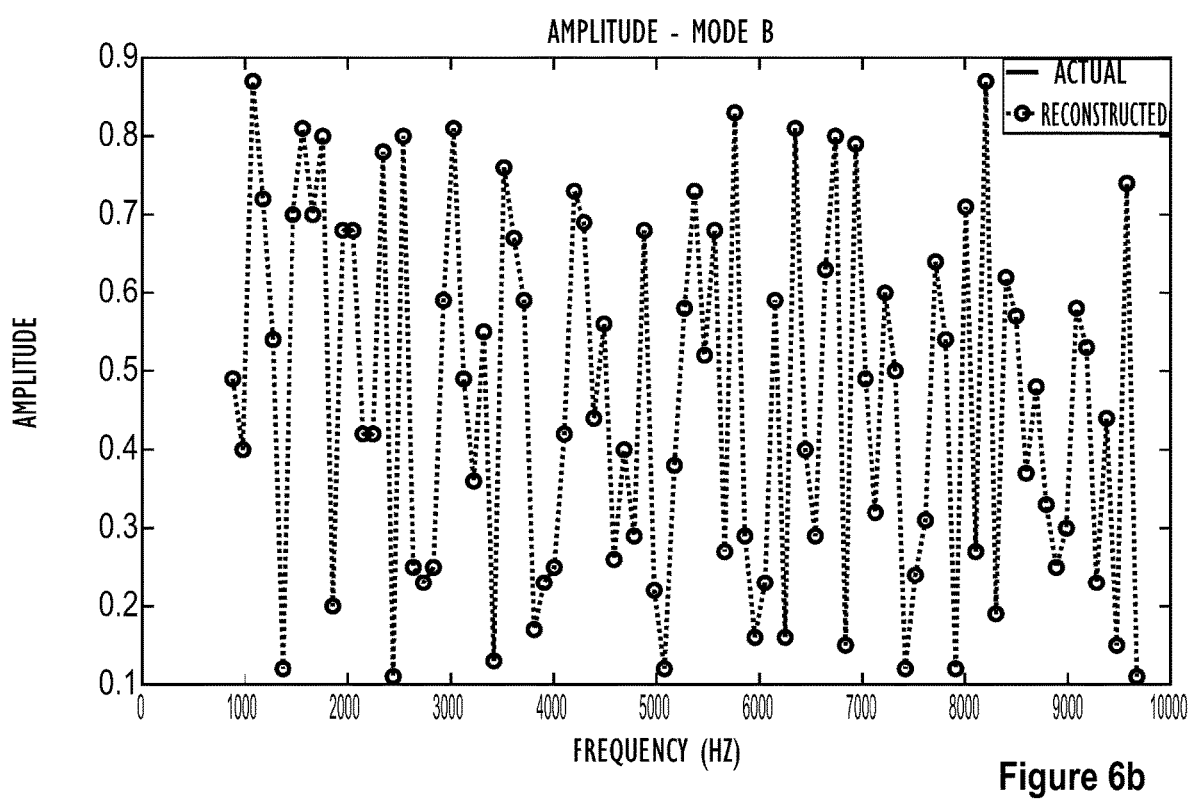

In FIGS. 6a and 6b amplitude values (y-axis) are plotted against frequency. The line plots illustrate the input amplitudes of first (FIG. 6a) and second (FIG. 6b) non-limiting, illustrative acoustic modes. The circles represent amplitude values determined using methods disclosed herein and illustrate perfect matching of the method outputs and the input amplitudes. This demonstrates that users may gain very high confidence in the accuracy of amplitudes output as a result of practicing of the methods.

FIGS. 7a and 7b show the results of operation of the methods to extract Stoneley (FIG. 7a) and flexural (FIG. 7b) mode waveforms from the intermingled signals stimulated at the receivers. FIGS. 7a and 7b illustrate the usefulness of the methods in separating multiple, intermingled modes from one another in a manner providing highly useful information.

FIG. 8 plots an original waveform stimulated non-limitingly at a receiver such as receiver 29 of FIG. 1 (dark plot line) and the resulting waveform reconstructed using the methods (light-shaded plot line). Again the agreement between the input and output plots is virtually exact.

The input waveforms in FIGS. 6 to 8 are modelled waveforms but the inventors have produced comparably accurate and useful results when practicing the methods of field acoustic log signals.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A method of invertibly transforming acoustic log signals comprising the steps of:
   a) inserting into a borehole, forming part of a borehole-formation system in which the borehole penetrates a rock formation, an elongate acoustic logging tool, the acoustic logging tool including at least one acoustic source and, spaced from the acoustic source along the logging tool, a sequential array of two or more acoustic signal receiver stations, the receiver stations each including at least one receiver and being spaced along the logging tool from the acoustic source by successively greater known transmitter-receiver distances whose minimum separation is greater than the minimum detectable wavelength corresponding to a formation slowness range of interest;

b) causing the acoustic source to emit acoustic energy in a manner (I) effecting the propagation in the borehole-formation system towards the receiver stations of plural signal packets exhibiting paths characteristic of at least first and second respective modes one or more of which is dispersive and (II) stimulating at least two receivers of respective, sequential, spaced receiver stations to generate at least one output signal per receiver station that is indicative of the signal packets, received at the at least one receiver of each respective receiver station, representing the modes in combination with one another;

c) transforming the output signals into respective transformed mode signals containing phase and amplitude information of each respective mode across the array and in which estimated phase and amplitude information are linked by an operator to the slowness and attenuation characteristics of the respective mode and the transmitter-receiver distance of the respective receiver station;

d) using the estimated phase and amplitude information for each mode from each receiver in the acoustic array to extract slowness and attenuation information for each mode from the output signals and generating signals indicative of the slowness and/or attenuation characteristics; and e) using the signals indicative of the slowness and/or attenuation characteristics in plotting, storing; transmitting, displaying, printing or further processing the slowness and/or attenuation characteristics, wherein the Step d) of using the estimated phase and amplitude information for each mode to extract slowness and attenuation information for each mode from the output signals includes f) generating complex spectra information from the receiver array signals and taking the real and imaginary parts of the transformed mode signals containing respective amplitude and phase components of the respective modes;

wherein the method includes the steps of:

g) in cases where the number of receivers exceeds the minimum necessary to determine slowness and amplitude values for each frequency and mode of interest, solving for mode amplitude and slowness by minimizing in a least squares sense the differences between real and imaginary mode amplitudes and the real and imaginary amplitudes of the combined modes observed in the spectra of received signals for each frequency, and h) representing the real and imaginary parts between estimated and received signals as objective function signals and summing the squares of the objective function signals over the two or more receiver stations; and wherein the Step g) includes minimizing the error between terms representing the amplitude and phase detected at the receivers and terms representing amplitude and phase components in the real and imaginary parts, including using initial estimates of the amplitude and phase components of the respective modes, and using a search method to minimize the said error.

2. A method according to claim 1 wherein the step of transforming the output signals into transformed mode signals is performed using an electronic circuit or using a processing device.

3. A method according to claim 1 wherein the inter-receiver distance along the logging tool between each adjacent pair of the receiver stations is the same.

4. A method according to claim 1 wherein the Step g) of minimizing the error between terms representing the amplitude and phase detected at the receivers, and terms representing amplitude and phase components in the real and imaginary parts includes seeding expressions representing the signals with estimated values of the slownesses of the respective modes, and solving for values of the respective amplitudes that minimize the said error.

5. A method according to claim 1 wherein the Step c) of transforming the output signals into respective transformed mode signals includes representing the transformed mode signals in the form $C_n \cos(c_n) - (A \cos(a_n) + B \cos(b_n)) = 0$, in which $C_n$ is the amplitude of the signal stimulated at receiver n of the array; $c_n$ is the corresponding phase; A is the estimated amplitude of the first mode stimulated across the array at a given frequency; $a_n$ is the estimated phase of the first mode stimulated at receiver n of the array; B is the estimated amplitude of the second mode stimulated across the array at the given frequency; and $b_n$ is the estimated phase of the second mode stimulated at receiver n of the array; and wherein the Step d) of using the estimated phase and amplitude information for each mode to extract slowness and attenuation information for each mode includes using the error expressions to minimize the error between the terms $C_n$ and $c_n$ on the one hand, and the terms A, B, $a_n$ and $b_n$ on the other.

6. A method according to claim 1 including repeating at least Steps c) and d) in respect of a range of frequencies of the respective output signals.

7. A method according to claim 1 including the step of constructing respective mode signals in respect of each receiver within the array.

8. A method according to claim 1 wherein the first and second modes respectively are flexural and Stoneley acoustic modes.

9. A method according to claim 1 wherein the first and second modes respectively are flexural and Stoneley acoustic modes; and including the step of creating a reconstructed array signal from the constructed respective mode signals in order to permit comparison between the reconstructed array signal and the output signals.

10. A borehole-apparatus system comprising:
(A) a borehole penetrating a rock formation;
(B) an elongate acoustic logging tool, the acoustic logging tool including at least one acoustic source and, spaced from the acoustic source along the logging tool, a sequential array of acoustic signal receiver stations, the receiver stations each including at least one receiver and being spaced along the logging tool from the acoustic source by successively greater known transmitter-receiver distances, the acoustic source being capable of emitting acoustic energy with linear or non-linear phase characteristics in a manner (i) effecting the propagation in the borehole-formation system towards the receiver stations of plural signal packets exhibiting paths characteristic of at least first and second respective modes one or more of which is dispersive and (ii) stimulating at least one receiver of each sequential receiver station to generate at least one output signal per receiver station that is indicative of the signal packets, received at the at least one receiver of each respective receiver station, representing the modes in combination with one another; and (C) one or more processing devices that is operatively connected to the acoustic logging tool and is capable of carrying out in respect of the output signals at least Steps (c), (d), (f), (q) and (h) according to the method of claim 1.

11. A computer-readable storage medium comprising instructions which, when executed by a computer, cause the computer to carry out at least Steps (c), (d), (f), (g) and (h) of the method according to claim 1.

* * * * *